(12) United States Patent
Nelson

(10) Patent No.: US 7,093,194 B2
(45) Date of Patent: Aug. 15, 2006

(54) DATA ACCESS SYSTEM

(75) Inventor: Bruce Arthur Nelson, Minneapolis, MN (US)

(73) Assignee: SwiftKnowledge, Inc., Eden Prairie, MN (US)

( * ) Notice: Subject to any disclaimer, the term of this patent is extended or adjusted under 35 U.S.C. 154(b) by 731 days.

(21) Appl. No.: 09/823,231

(22) Filed: Mar. 30, 2001

(65) Prior Publication Data

US 2002/0087633 A1 Jul. 4, 2002

Related U.S. Application Data

(60) Provisional application No. 60/243,974, filed on Oct. 27, 2000.

(51) Int. Cl.
*G06F 3/00* (2006.01)

(52) U.S. Cl. ...................................... 715/513; 715/509

(58) Field of Classification Search ................ 715/513, 715/501, 509, 533, 517, 523, 530; 345/762, 345/502
See application file for complete search history.

(56) References Cited

U.S. PATENT DOCUMENTS

| | | | | |
|---|---|---|---|---|
| 5,359,724 A | * | 10/1994 | Earle | 707/205 |
| 5,926,818 A | * | 7/1999 | Malloy | 707/100 |
| 6,122,636 A | * | 9/2000 | Malloy et al. | 707/102 |
| 6,161,114 A | * | 12/2000 | King et al. | 715/517 |
| 6,484,179 B1 | * | 11/2002 | Roccaforte | 707/102 |
| 6,510,164 B1 | * | 1/2003 | Ramaswamy et al. | 370/466 |
| 6,601,108 B1 | * | 7/2003 | Marmor | 709/246 |
| 6,628,312 B1 | * | 9/2003 | Rao et al. | 345/853 |

OTHER PUBLICATIONS

Documentation "Data Pane (Virtual Cube Editor)," Microsoft Analysis Services 2000, Microsoft Corporation, Redmond, WA.
Documentation "Browing Cube Data," Microsoft Analysis Services 2000, Microsoft Corporation, Redmond, WA.
Documentation "Cube Editor—Data View," Microsoft Analysis Services 2000, Microsoft Corporation, Redmond, WA.

* cited by examiner

*Primary Examiner*—Stephen Hong
*Assistant Examiner*—Kyle R. Stork
(74) *Attorney, Agent, or Firm*—Shumaker & Sieffert, P.A.

(57) ABSTRACT

A web-based data access system is described that allows users to easily access, manipulate and share information. The users can access the system to create customized view of the data and share the views with others. The data access system includes a database for storing multidimensional data. Electronic reports are stored as report object on a server and define dimensions and members of multidimensional data that are included in an electronic report. A page generation module executes on the server to access the multidimensional data and format a web page based on the report object. A packet engine communicates the web page to a client device in a stream of packets for display to the user.

23 Claims, 42 Drawing Sheets

DATA ACCESS SYSTEM

DATA ACCESS SYSTEM

This application claims priority from U.S. Provisional Application Ser. No. 60/243,974, filed Oct. 27, 2000, the contents being incorporated herein by reference.

TECHNICAL FIELD

The invention relates to networked computer systems and, more particularly, computer systems for accessing and sharing data.

BACKGROUND

Despite the billions of dollars spent on creating vast databases, corporations face staggering problems finding and delivering timely information into the hands of decision makers. Existing systems for accessing databases often require teams of analysts and programmers to extract and massage the data. Some conventional systems allow users to remotely view data via a network, such as the World Wide Web ("the Web"), but the data typically in the form of inflexible reports cannot be customized. End users typically cannot create and customize reports and graphs; they typically are forced to use a number of pre-defined, static reports. As such, employees, customers and supply chain partners are often unable to access and utilize valuable information, which results in under-informed, delayed business decisions.

SUMMARY

In general, the invention provides a web-based data access system that allows people to easily access, manipulate and share information. The web-based nature of system allows users to create and publish reports, view reports and graphs, data mine, and manage user access, security and content. The users can access and distribute information over a computer network, such as the World Wide Web ("the Web") or an organization's Intranet, in a greatly simplified manner. In addition, the users can easily access a shared report and create a new, customized report having a refined view of the data. In this manner, information can be more readily distributed to a diverse audience of users, and yet easily customized to provide valuable information to each user.

In one embodiment, the invention is directed to a web-based data access system in which a database stores multi-dimensional data, often in the form of data cubes, and the underlying transactional data. Electronic reports are stored as report object on a server and define dimensions and members of multidimensional data that are included in an electronic report. A page generation module executes on the server to access the multidimensional data and format a web page based on the report object. A packet engine communicates the web page to a client device in a stream of packets for display to the user. The client device stores the data received from the packet engine in a "virtual table" and maintains pointers defining a viewing window within the virtual table.

In one embodiment, the client device maintains a client-side representation of the report object in order to perform some operations locally. A model converter executes on the server and translates the report object into a client side script that, when executed by the client, builds a client side representation of the report object, referred to herein as the presentation model. The presentation model is built in a native language or format supported by a browser executing on the client-device and controls how the browser presents the report to the user.

In another embodiment, the invention is directed to a method in which state data is stored that defines a current viewing location within a data table storing multidimensional data. A web page is formatted based on the state data. The web page is communicated to a client device for display to a user.

In another embodiment, the invention is directed to a computer-readable medium to cause a programmable processor to store state data defining a current viewing location within a data table storing multidimensional data, format a web page based on the state data; and communicate the web page to a client device for display to a user.

In another embodiment, the invention is directed to a method in which multidimensional data is communicated to a client device. The data on the client-device and pointers are maintained defining a viewable window within the stored data. A web page is formatted to include data within the viewable window of the stored data and displayed to a user.

In another embodiment, the invention is directed to a method in which a report object is stored that defines dimensions and members of multidimensional data to be included in an electronic report. The report object is translated into a client-side script, which is communicated to a client device. The client-side script is executed to create a representation of the report object on the client-device.

The invention provides many advantages. For example, the invention provides an integrated environment for defining data cubes and composing, viewing and publishing reports for access by other users. A user can graphically select and incorporate the various dimensions and members of the data cube into the report. Report generation and publishing are tightly integrated such that the user can toggle back and forth between composing reports and publishing the reports to distributed users.

Because the system is a "thin-client" web-enabled solution, as described below, the system is flexible, accessible, and integrated completely on the Web. Also, the software is cross-platform compatible and is independent of the client-device used by the user. Users can access the system from any computer connected to the network. The intuitive user interface gives users interactive access to databases without requiring programming or special training. Non-technical users can easily search for information with a standard web browser. Administrators can control security at a granular level, establishing "need-to-know" access on a user-by-user basis.

BRIEF DESCRIPTION OF DRAWINGS

FIGS. 34 through 42 illustrate various security mechanism allowing users to set access rights to the multidimensional data and the underlying transactional data from which the multidimensional data was derived.

DETAILED DESCRIPTION

Figure 1:
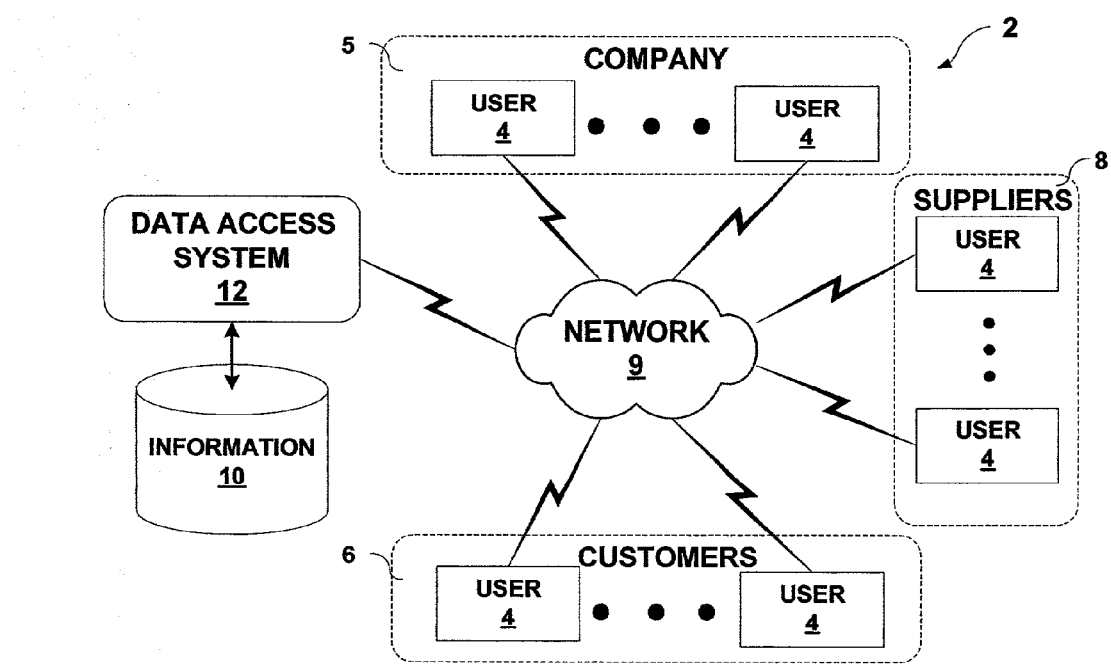
FIG. 1 is a block diagram of a system in which users interact with a data access system to easily view, manipulate and share information.

In general, the invention allows people to easily access, manipulate and share information. FIG. 1 is a block diagram illustrating a system 2 in which users 4 interact with data access system 12 to share information 10 via network 9. Users 4 can be any authorized individual, such as employees 5, customers 6 and suppliers 8 of a company, and may be geographically distributed. By interacting with data access system 12, as described below, users 4 can access, analyze, and create personal views of information 10. For example, a chief financial officer of the company can create a number of graphs or reports detailing the financial health of the company. A sales manager can create a report of sales per geographic region for sales representatives of the company, or a report listing sale items available to specific customers 6. A plant manager can create a report listing current inventory levels and grant access to suppliers 8.

Each user 4 typically interacts with a computing device suitable for accessing data access system 12 via network 9. For example, a user 4 may use a personal computer, laptop computer, or even a personal digital assistant (PDA) such as a Palm™ organizer from Palm Inc. of Santa Clara, Calif. The communication device typically executes communication software, typically a web browser such as Internet Explorer™ from Microsoft Corporation of Redmond, Wash., in order to communicate with data access system 12. Network 9 represents any communication link suitable for communicating data, such as a wide-area network, local area network, or a global computer network like the World Wide Web.

Figure 2:
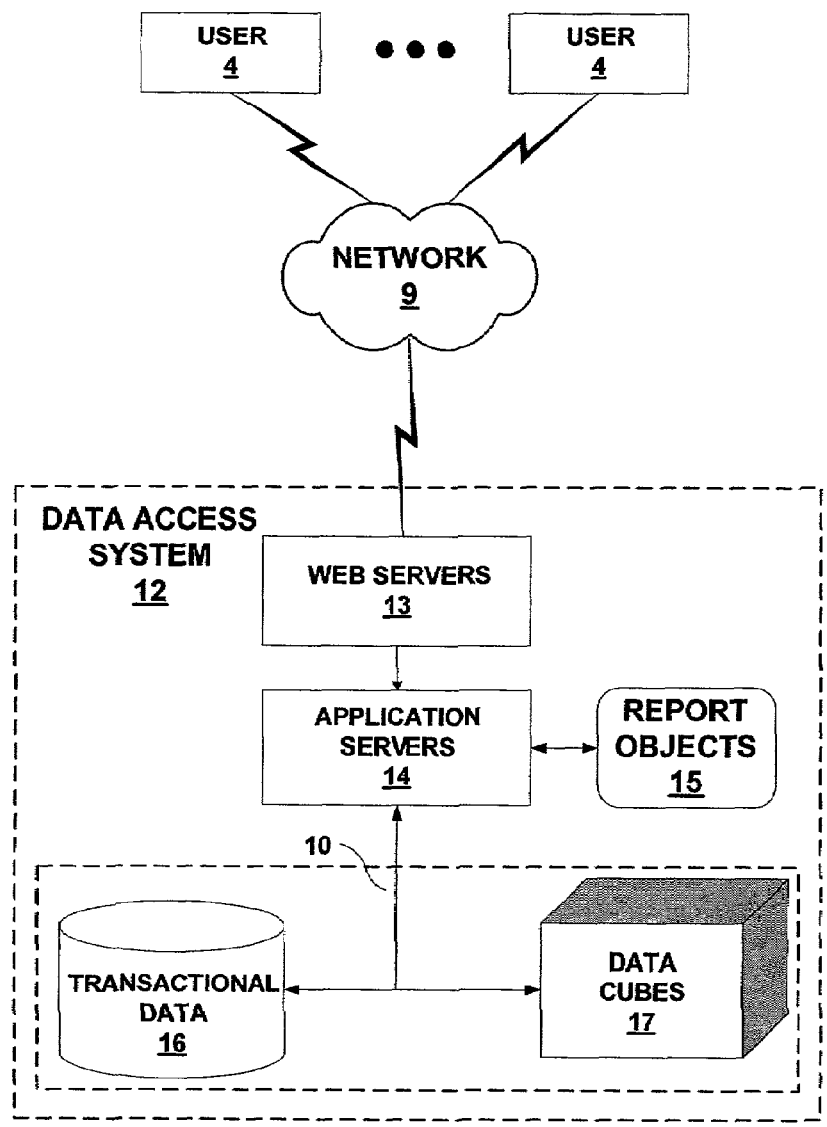
FIG. 2 is a block diagram illustrating the data access system in further detail.

FIG. 2 is a block diagram illustrating data access system 12 in further detail. Web servers 13 provide a web-enabled interface for communicating with users 4 via network 9. Application servers 14 allow users 4 to organize and summarize information 10 in multiple dimensions. More specifically, by interacting with web servers 13 and application servers 14, users 4 can access, analyze, and share transactional data 16 in the form of data cubes 17. In one configuration, web servers 13 execute web server software, such as Internet Information Server™ from Microsoft Corporation, of Redmond, Wash. As such, web servers 13 and application servers 14 collectively provide a web-based environment in which users 4 interact with information 10. Web servers 13 and application servers 14 may execute a variety of software modules including Active Server Pages, Java scripts, Java Applets, Lotus scripts, web pages written in hypertext markup language (HTML) or dynamic HTML, extensible markup language (XML), component object module (COM) objects, and the like.

Each data cube 17 is a self-contained multidimensional view of a portion of transactional data 16. For example, a sales manager may organize transactional 16 data into a cube having four dimensions: Product, Location, Salesperson and Sales Revenue. In addition, each dimension may be hierarchically ordered. For example, the Location dimension may be ordered as North America, Midwest, Minn. and Woodbury. Generally, the elements of the hierarchy for a dimension are referred to as parent members, children members and siblings.

Transactional data 16 represents the underlying "raw" data maintained by data access system 12. For example, transactional data 16 may include all sales orders, invoices, shipping data, employee records, customer contact information and other information maintained by a company or other entity. Transactional data 16 may be implemented as one or more database management systems (DBMS) executing on one or more database servers that support on-line analytical processing (OLAP) services for analyzing data in multidimensional form. The database management systems may be a relational (RDBMS), hierarchical (HDBMS), multidimensional (MDBMS), object oriented (ODBMS or OODBMS) or object relational (ORDBMS) database management system.

As illustrated in detail below, users 4 provide access to the multidimensional data of data cubes 17 by creating and publishing electronic reports in the form of report objects 15. A report object 15 defines the structure of a corresponding data cube 17 including the dimensions of the cube, the members of each dimension and the hierarchy of the members as well as the layout, security settings and other as aspects of the report.

Figure 3:
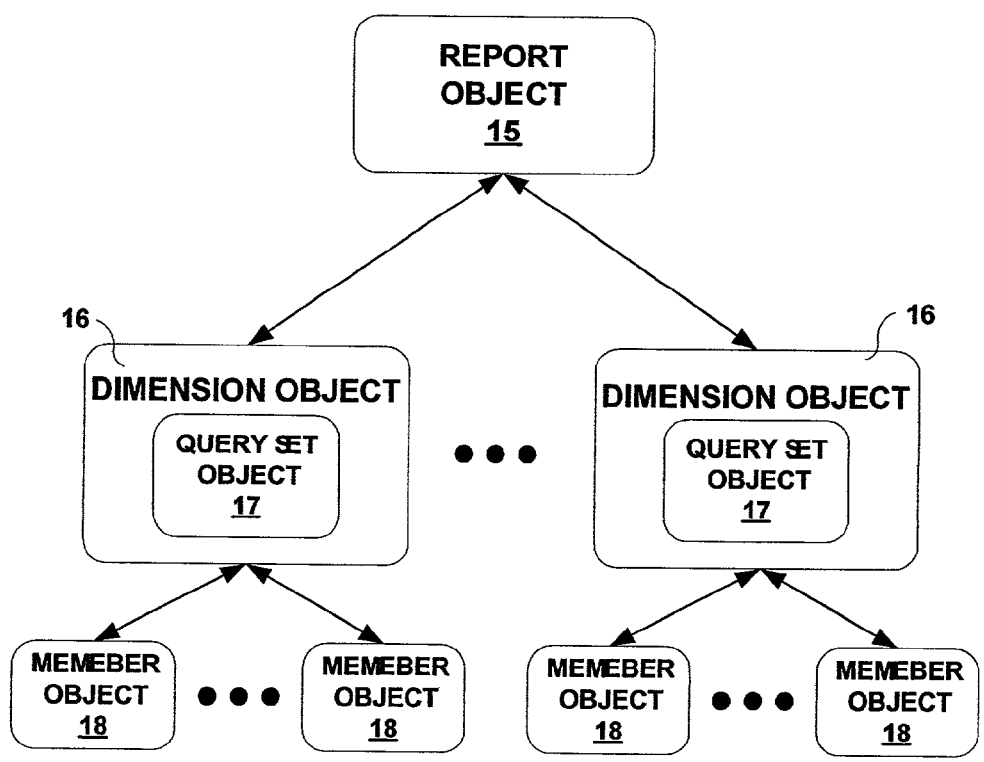
FIG. 3 is a block diagram illustrating an example configuration of a report object.

FIG. 3 is a block diagram further illustrating an example configuration of a report object 15. Each report object 15 links to a number of corresponding dimension objects 16. Similarly, each dimension object 16 has a corresponding query set object 17, which in turn links to one or more member objects 18. The structure and organization of report object 15, dimension object 16, query set object 17 and member object 18 define the contents, layout and access control for the report. For example, report object 15 controls which dimensions are assigned along the rows and columns of the corresponding data cube 17.

In one embodiment, these objects are stored in XML form as files on application server 14 until accessed and then instantiated within the session of the user. In another embodiment, in order to support scalability such as a web farm, the report objects are not stored as a file but are serialized and stored in binary format within a database. Upon a request for a report, the binary data can be retrieved and loaded into application server 14, thereby regenerating reporting object 15 quickly.

Member objects 18 are included within a report object 15 based on which members are necessary to select and retrieve data from transactional data 16 in order to correctly populate the report. In response to a request from a user 4 to open a report object 15, application server 14 retrieves the store report object, extracts the cube definition and starts assembling report object 15 including dimension objects 16, query set object 17 and member objects 18.

There are a number of attributes associated with the query set objects 17 and a number of relationships between the query sets. In one embodiment, data access system 12 can support expansions of two types: outer to inner and inner to outer. Support of an inner to outer expand allows a report to replicate members across all the outer dimensions. Conversely, an outer to inner expand does not replicate the expanded member across dimensions. As described below a user interface for data access system 12 allows the user 4 to view the report in one of two expand modes: multiple or expand single.

Figure 4:
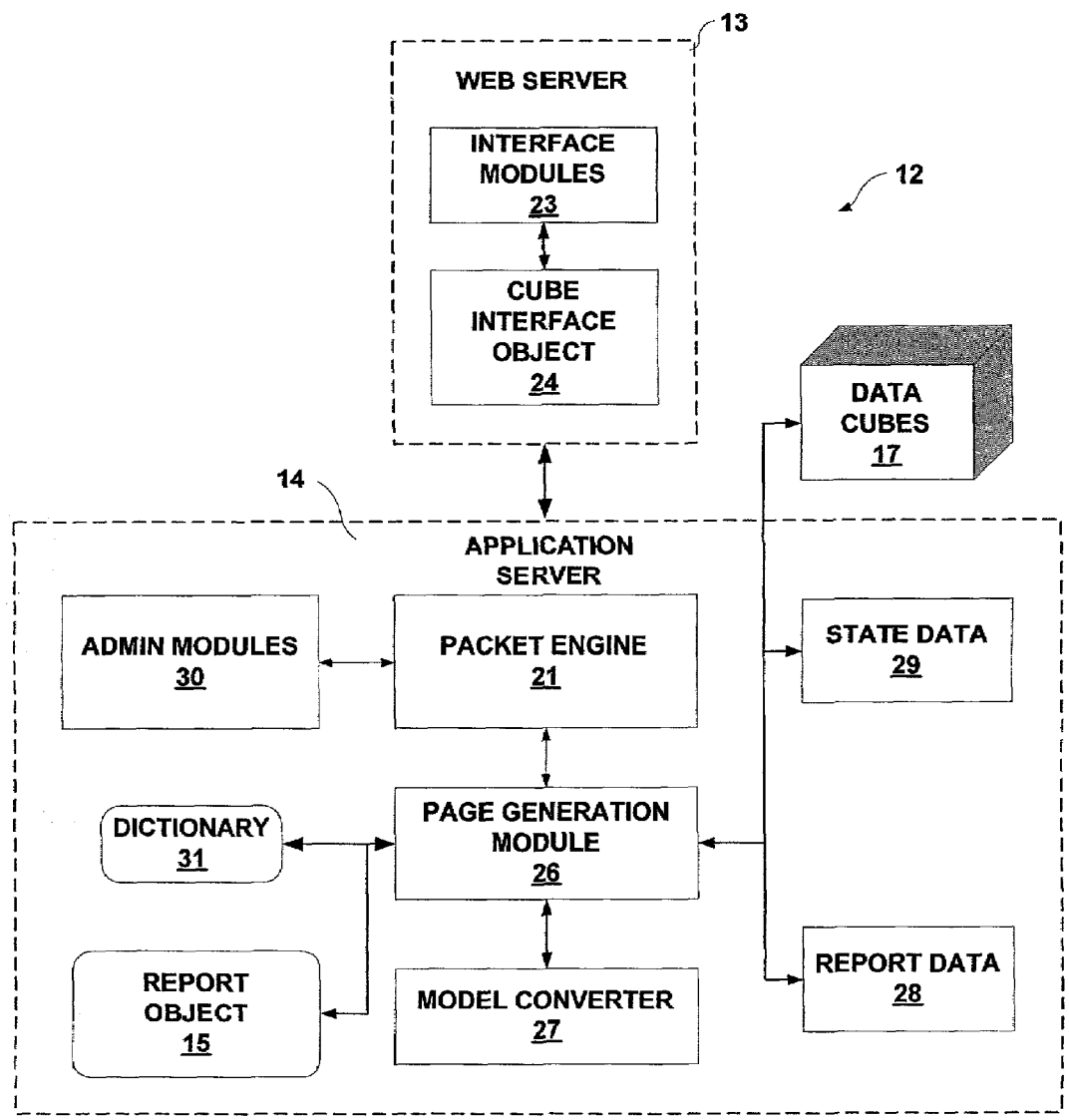
FIG. 4 is a block diagram illustrating the data access system in further detail.

FIG. 4 is a block diagram illustrating data access system 12, and the various software components executing thereon, in further detail. Interface modules 23 execute on web server 13 and provide a web-based interface for interacting with users 4. As described above, interface modules 23 may comprise a variety of software modules including Active Server Pages, Java scripts, Java Applets, Lotus scripts, web pages written in HTML, DHTML or XML, and other suitable software modules.

Cube interface object 24 is an interface class having a number of methods (routines) for manipulating and controlling report object 15 in response to user requests received from interface modules 13. In one embodiment, interface modules 23 includes a number of web pages, such as active server pages, and each web page corresponds to one of the interface methods of cube interface object 24. In this embodiment, web server 13 directs each user request to the appropriate web pages of interface modules 23, which in turn invoke the corresponding method interfaces provided by cube interface object 24. For example, a StartUp web page of interface modules 23 may include a header, a footer and code for invoking a StartUp method of cube interface object 24 and passing a unique cube identifier. The following table lists an example API supported by cube interface object 24:

TABLE I

Startup (ByVal vCubeID As Integer) - Initiates a compose session for a cube specified by a CubeID.
Restore (ByVal vReportID As String) - Opens a published report specified by a ReportID.
Expand (ByVal vAxis As Integer, ByVal vPos As Integer, ByVal vInd As Integer) - Adds the first accessible children to the query set for the expansion point specified by the arguments and updates the client display.
Collapse (ByVal vAxis As Integer, ByVal vPos As Integer, ByVal vInd As Integer) - Removes the children from the query set from the collapse point specified by the arguments and updates the client display.
Move (ByVal vName As String, ByVal vFromAxis As String, ByVal vFromIndex As Integer, ByVal vToAxis As String, ByVal vToIndex As Integer, Optional ByVal vBeforeAfter As String = "BEFORE") - Move a dimension from one location to another within the axes structure based on the specified arguments.
Reset () - Resets to the default cube view when in Compose mode. Or when in Publish mode, resets to the original report definition.
Compose () - Move to Compose mode from Publish mode.
Publish () - moves to Publish mode from Compose mode.
Save () - Publish mode only function. Update the report definition, keeping name and folder intact.
SaveAs (Optional ByVal vName As String = "", Optional ByVal vFolder As String) - Publish mode only function. Save a report definition into the database and add the report name to a navigation folder.
Bookmark () - Saves the report or cube view definition and returns the reportID to the caller.
ToggleEmptyRows () - Toggles between suppress empty rows and show empty rows. Updates the user view accordingly.
ToggleSlicer (ByVal vOpen As Boolean) - Set and store on the data access system the state of the filter window on the client device (opened or closed).
ToggleExpandMode () - Toggles between multiple and single expand modes.
JS (ByVal vPacketPos As Integer, ByVal vPacketDim As Integer, ByVal vPacketRow As Integer, ByVal vInitPacket As Boolean) - Return the report data and map in JavaScript object variables.
CSV () - Return the report data in comma separate (CSV) file format.
GetColNamesFromLogical (ByVal vStartCol As Integer, ByVal TABLE I-continued vColCount As Integer) As String - Return unique names and captions for the logical start column and count.
GetRowNamesFromLogical (ByVal vStartRow As Integer, ByVal vRowCount As Integer) As String - Returns unique names and captions for the logical start row and count.
GetNonDefaultFilterNames () As String - Returns unique names of the filters that are not defaulted.
ScrollReport (ByVal vStartCol As Integer, ByVal vStartRow As Integer) - Updates the server side with the start column and start row passed in on the arguments.
ListFilters () - Assemble filters list in checkbox form to be presented to user.
Filters () - Assign the selected dimensions (form created by ListFilters) as filters.
SetupPrint (ByVal vHeights As String) - Read in report height values to be used in formatting printing; pass processing on to SetupPrintPage.
SetupPrintPage (Optional ByVal vOrientation As Integer = ePortrait, Optional ByVal vpaperWidthInches As Single = 0, Optional ByVal vPaperHeightInches As Single = 0, Optional ByVal vCalledBySetupPrint = False) - Called by SetupPrint and set_page_size.asp to establish print page values; pass processing onto GeneratePrintBatch.
SetupPrintBatch (Optional ByVal vInitial As Boolean = False) - Called by SetupPrintPage and setup_print_batch.asp; returns a print preview based on the print page setup values.
Slice (ByVal Value As String) - Assign the selected Slice (form created by ListSlicer) as a Slice.
ListSlice (ByVal vUniqueName As String, ByVal vDirective As String) - Assemble Slicer list in checkbox form to be presented to user.
Subselect (ByVal vDirective As String, Optional ByVal vid As String) - Assign the selected Subselect (form created by ListSubselect) as a Subselect.
ListSubselect (ByVal vAxis As Integer, ByVal vOriginName As String, ByVal vDirective As String) - Assemble Subselect list in checkbox form to be presented to user.

Page generation module 26 constructs queries to retrieve multi-dimensional data from data cubes 17 based on report object 15. In one embodiment, an OLAP server storing data cube 17 executes the queries and communicates a result set to cube interface object 24 in response. Page generation module 26 stores the result set as report data 28.

State data 29 includes a variety of information defining the current viewing state of the user including the current row, current column, font size, column width, row height, column height, row width, the number of lines, labels consumed, and the like. Page generation module 26 analyzes the results and determines how to best layout the report, given report object 15, state data 29 and report data 28. Page generation module 26 performs various calculations to determine the appropriate layout for the viewable page and, upon concluding those calculations, generates the appropriate code such as HTML. Page generation engine 26 formats the appropriate query string based on the report object model 15 and invokes the OLAP services in order to generate the code. Based on the responses, page generation module 26 builds dictionary 31, which comprises a list of accessible members.

Because the page layout calculations are performed by page generation module 26, a web browser executing on the client-device can render and display the page quicker than in other systems that perform similar calculations at the client. Page generation module 26 generates the client-side code for displaying the current page using a conventional browser. In one embodiment, page generation module 26 generates the page to display a subset of the data returned in the results set and communicates the remaining data to the client-device in the background.

As described below, the client device of user 4 maintains a client-side representation of report object 15 in order to perform some operations locally. Model converter 27 of application server 14 translates report object 15 into a client side script that, when executed by the client, builds a client side representation of report object 15, referred to herein as the presentation model. The presentation model is built in a native language or format supported by a browser executing on the client-device and controls how the browser presents the report to the user.

Packet engine 21 transmits information, including the report pages generated by page generation module 26, the client-side script generated by model converter 27 and report data 28 to the client device in a stream of packets. As described below, packet engine 27 may communicate an initial set of packets such that the client device can quickly display a first page of the report to the user, with the remaining packets transferred in the background.

Admin modules 30 allow users 4 to define web-access rights for data cubes 17 and transactional data 16. When creating a report, a user can define fine-grain access control rights, thereby controlling access to individual members of the various dimensions. Furthermore, as illustrated in detail below, the user can define the extent to which other users can customize the report.

Figure 5:
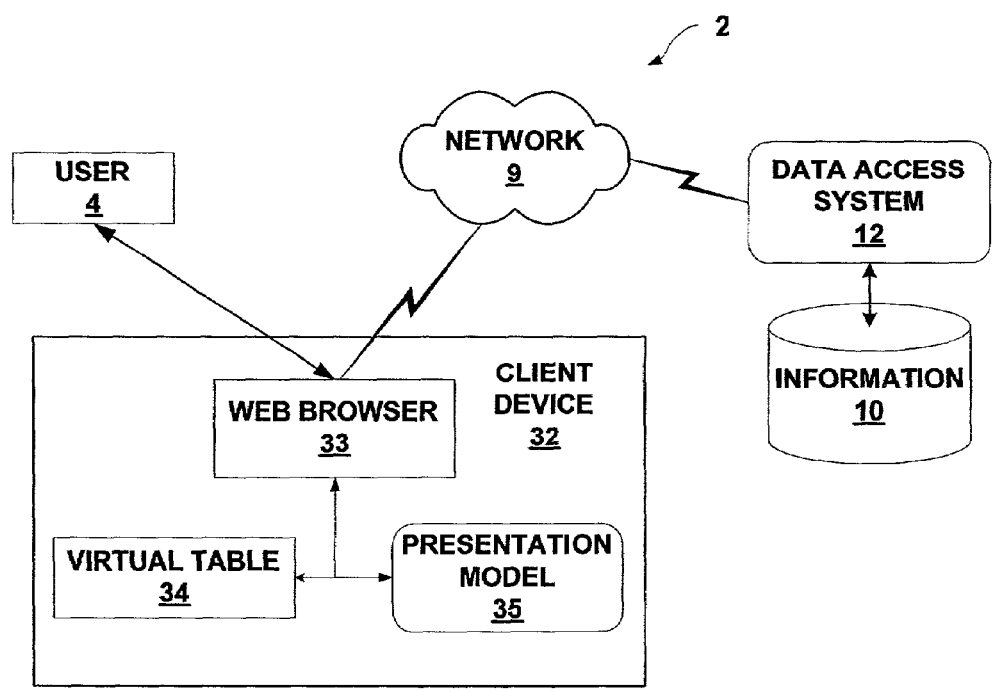
FIG. 5 is a block diagram illustrating a client-device through which a user can interact with the data access system.

FIG. 5 is a block diagram illustrating the various components that may reside upon a client-device 32 through which user 4 interacts with data access system 12. Notably, client-device 32 is a "thin-client" that does not require software to be installed other than a web browser 33, such as Internet Explorer™ from Microsoft Corporation. Furthermore, because much of the page layout and data presentation is handled by data access system 12, no additional "plug-in" is needed for browser 33, such as client-side ActiveX or Java Applets. As such, system 2 is flexible and can be integrated completely on the web.

As described above, web browser 33 receives scripts from model converter 27 of data access system 12 (FIG. 4) that causes browser 33, upon execution of the scripts, to build and maintain presentation model 35, which is a client-side representation of report object 15. Presentation model 15 controls how browser 33 presents the report to the user. In one embodiment, model converter 27 generates the scripts in Jscript format such that web browser 33 builds presentation model 33 according to a standard document object model supported by Internet Explorer™ from Microsoft Corporation™.

Web browser 33 receives data from data access system 12 and stores the data in virtual table 34. A subset of the data within virtual table 34 is used to fill the current web page displayed to user 4. Web browser 33 renders and displays the web page based on presentation model 35 and the data stored within the currently viewed portion of virtual table 34.

Figure 6:
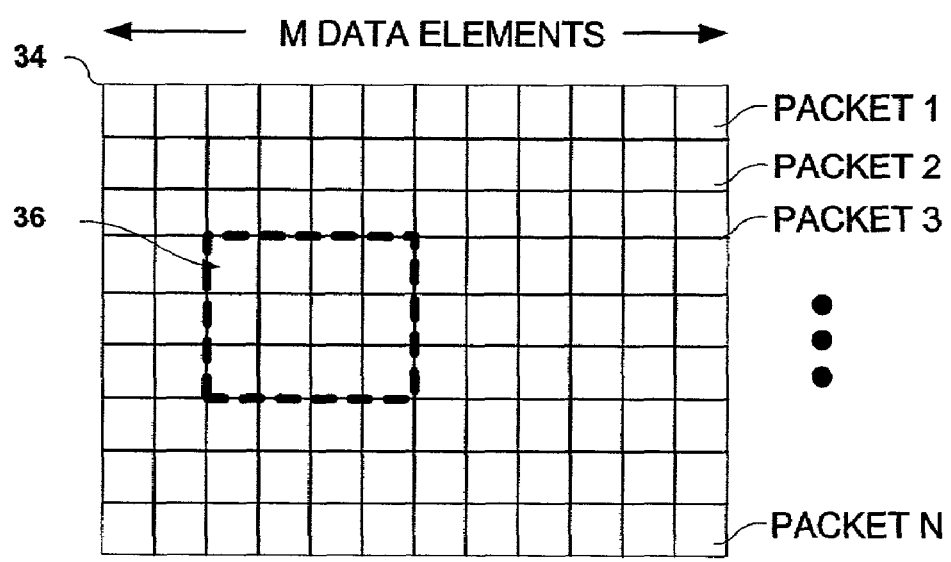
FIG. 6 illustrates a virtual table maintained on the client-device for storing data received from the data access system.

FIG. 6 illustrates in further detail a virtual table 34 for storing data received from data access system 12. As described below, data access system communicates the data in a stream of packets, which client-device 32 assembles to form virtual table 34. Based on input from the user, such as a request to scroll down, client-device 32 manipulates pointers into the virtual table 36 to retrieve and display a viewable window 38 of the data. Client-device 32 manipulates the document object model of web browser 33 based on input received from user 4 and data extracted from viewable window 38. When the document object model is adjusted, browser 22 refreshes the display of client-device 32, thereby allowing the user to scroll viewable window 38 throughout virtual table 36 and display a number of rows and columns. In one embodiment, virtual table 36 is organized as a series of arrays.

Figure 7:
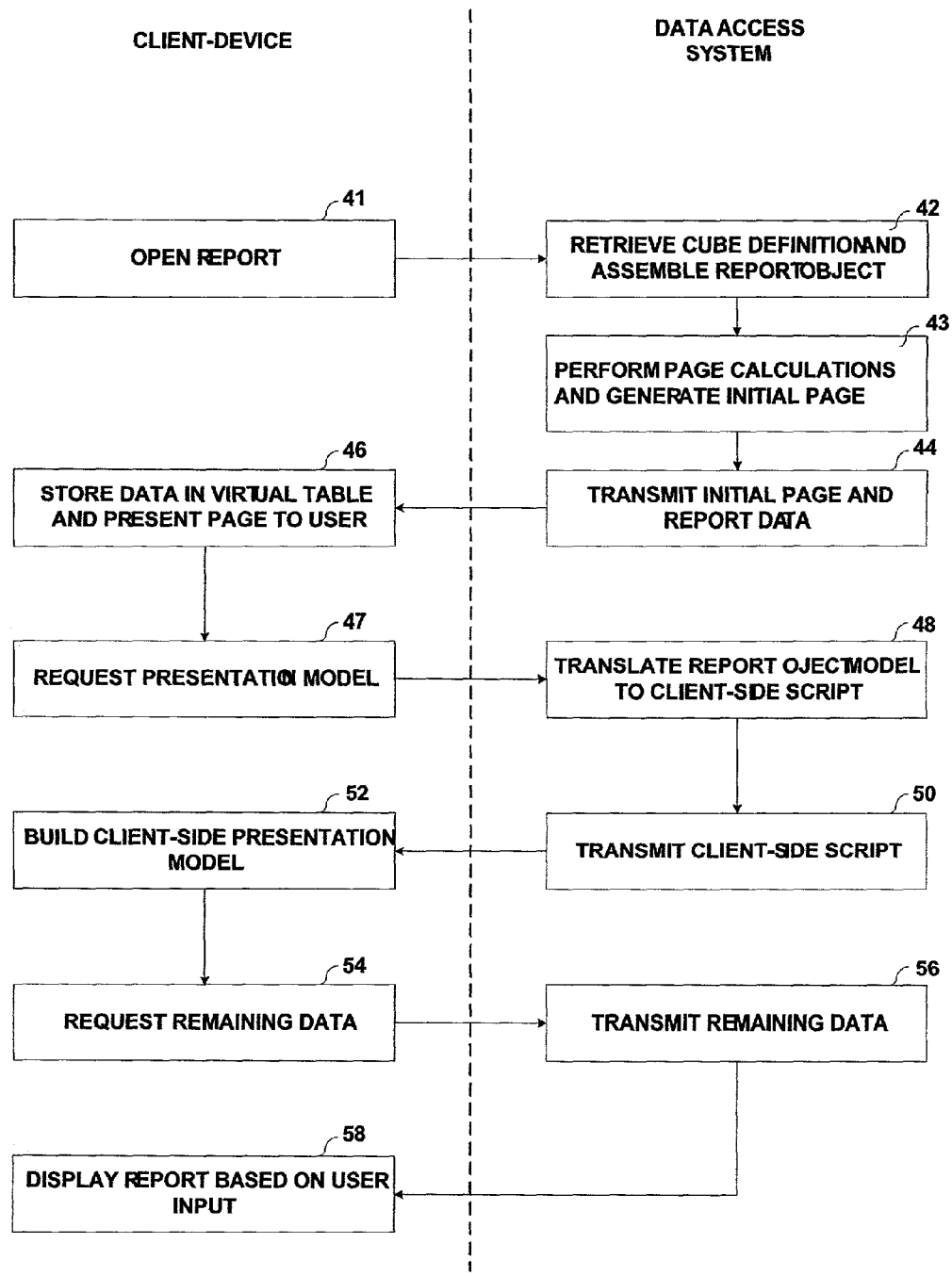
FIG. 7 is a flowchart illustrating a user accessing an existing report.

FIG. 7 is a flowchart illustrating a user 4 accessing an existing report. Initially, user 4 accesses data access system 12 via client device 32 and attempts to open a report (41). In response, page generation module 26 accesses one of the data cubes 17 corresponding to the requested report and retrieves the cube definition, including the number of dimensions and the members for each dimension (42). For example, in one embodiment, page generation module 26 issues queries to an OLAP server storing the data cube 17 in order to get the cube definition. Based on the responses, page generation module 26 builds dictionary 31 of accessible members and assembles report object 15, including instantiating dimension objects 16, query set objects 17 and member objects 18 as illustrated in FIG. 3 (42).

After building report object 15 for the requested report, page generation module generates an initial page for display to the user 4 (43). For example, generally the page present a portion of report data in table format arranged in rows and columns. Page generation module 26 analyzes the content of the page including: (1) labels for the individual columns, (2) labels of the page itself, and (3) the data returned in the result set from the OLAP server and calculates appropriate widths for the columns and the row headers to accommodate the content. Finally, based on the calculations, page generation module 26 generates the appropriate code, such as hypertext markup language (HTML), for displaying the initial page of the report to the user 4.

Next, packet engine 21 transmits an initial set of data packets to client-device 9 to populate an initial portion of virtual table 34 and display the initial web page (44). The initial packet includes all data necessary to display the first browser page as well as the HTML or other code for displaying the code. For example, packet engine 21 may transmit a single packet containing data to populate an initial ten rows of virtual table 34.

Upon receiving the initial packets, web browser 33 stores the data and presents the page to the user (46). After receiving the first packet web browser 33 displays scroll bars, thus giving the user the option to scroll through the data within virtual table 36. In this manner the user is able to quickly view the data while, as described below, client-device 32 receives the remaining data for virtual table 34. This allows a user to view the report without waiting for the full data set to load.

After browser 33 initially loads and displays the first page, an "unload" event triggers, which instructs client device 32 to retrieve the remaining data. Client device 32 issues a request to application server 22 and requests script for creating presentation model 35 (47). In response, model converter 27 translates report object 15 into a client-side script, such as J script, that when executed by browser 33, builds presentation model 35 as a client-side representation of the report object 15 (48). After model converter 27 generates the client-side script, packet engine 21 transmits the script to web browser 33 via network 8 (50). Upon receiving the script, client device 9 executes the script and builds a presentation model 35 (52). In addition, client device 9 requests any remaining data that the OLAP services returned to page generation module 26 in the result set, but that was not already transmitted to the client (54). Upon receiving the request, packet engine 21 transmits the remaining data in a series of packets to client device 9 for populating the remainder of virtual table 34 (56). The user can further manipulate the electronic report by interacting with browser 33 (58). For example, the user may request to expand a dimension, reload the data or scroll through the data.

Figure 8:
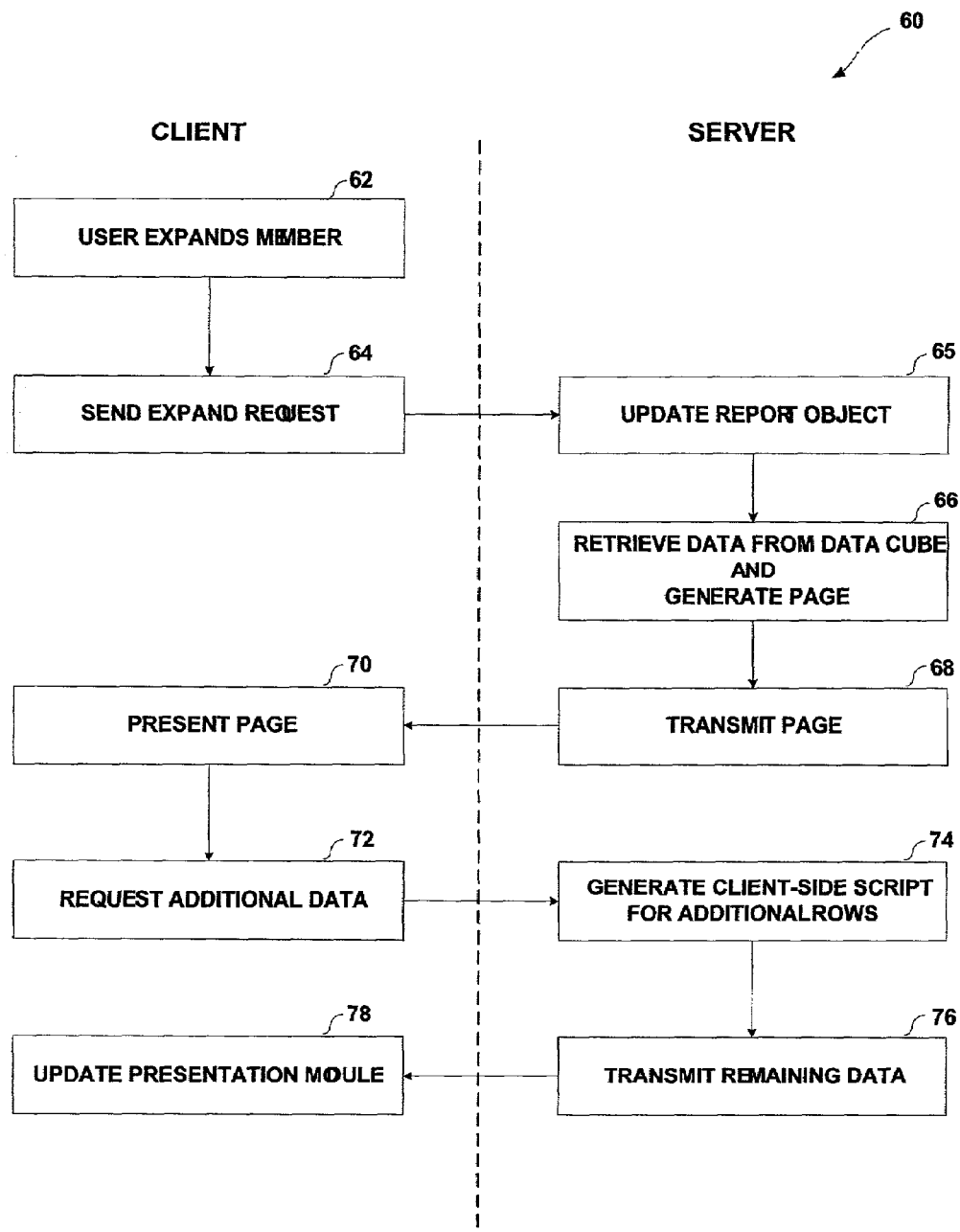
FIG. 8 is a flowchart of an example process illustrating the data access system handling a user request to expand a member of a dimension of the multidimensional data within a report.

FIG. 8 is a flowchart of an example process illustrating data access system 12 handling a user request to expand a member of one of the dimensions of the multidimensional data. In response to a user request to expand a member (62), web browser 33 sends an expand request to cube interface object 24 (64). As described above, in one embodiment web browser 33 accesses an Active Server Page corresponding to an expand request, which invokes a corresponding method of cube interface object 24. Cube interface object 24 updates report object 15 to reflect the changes to the report (65). For example, for an expand request, the report object model is updated to include all of the children of the member to be expanded.

Based on the updated report object 15, page generation module 26 constructs queries to retrieve multi-dimensional data from data cubes 17 based on report object 15 for expanding virtual table 36. In one embodiment, an OLAP server storing data cube 17 executes the queries and communicate a result set to page generation module 26 in response. Page generation module 26 stores the result set as report data 28 (66). When constructing the query, cube interface object 24 accesses state data 29 to determine the current location of viewing window 38 within virtual table 36 in order to reduce the amount of data retrieved from data cube 17, i.e., the size of the result set. In this manner, page generation module 26 retrieves data from data cube 17 that is localized to the current viewable window 38. The typical overhead of an expand operation is thereby lessened. In one embodiment, page generation module 26 retrieves all rows starting at the current position of viewable window 38 and below. In another embodiment, page generation module 26 retrieves only those rows proximate to window 38 within virtual table 36.

The result set is then used to update the report object model 15. For example, referring to FIG. 3, cube interface object 24 updates query set object 17 of one or more dimension objects 16 to reflect the expansion. In addition, cube interface object 24 updates member objects 18 of the expanded dimension to reflect the new members. Based on the updated report object 15, page generation module 26 performs the page calculations described above and generates HTML or other software for displaying the page to user 4 (66).

Next, as described above, packet engine 21 transmits an initial set of data packets to client-device 9 to populate an initial portion of virtual table 34 (68), which web browser 33 presents to the user 4 (70). Client device 32 then issues a request to application server 22 for the any additional data necessary to populate the expanded virtual table 36 (72). In response, model converter 27 generates client-side script to update presentation model 35 to redimension virtual table 36 to the appropriate number of rows to accommodate an expand or collapse request (74). In one embodiment, presentation model 35 is persistent between data loads. For example, presentation model 35 may be stored in a unique frame such that it remains in memory between page refreshes. Packet engine 21 transmits the script and any remaining data to client-device 32 (76). Client-device 32 executes the script to update presentation model 35 and stores the additional data in virtual table 36 (78).

Figure 9:
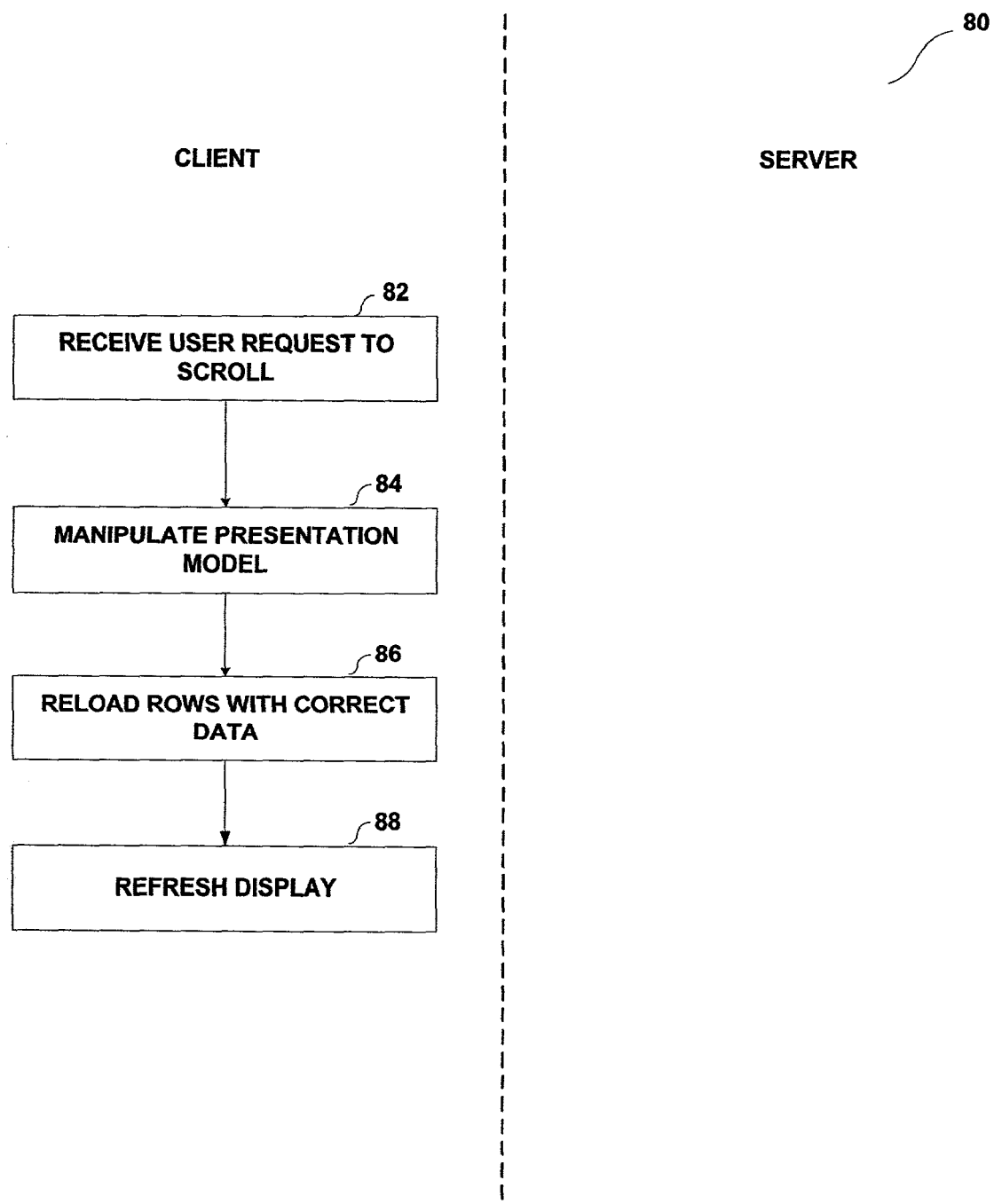
FIG. 9 is a flowchart of an example process for handling a user request to scroll a viewing window through the virtual table.

FIG. 9 is a flowchart of an example process for handling a user request to scroll viewing window 38 through virtual table 32. Notably, the entire request is serviced by client-device 9 without requiring communication with data access system 12. Upon receiving a user request to scroll (82), client-device 32 manipulates the presentation model 35, which may be in the form of a document object model (84). For example, client-device 32 may move a top row of the presentation model 35 to the bottom row, thereby shifting all the rows of the presentation model up. Next, client-device 32 loads the bottom row of the presentation model with data from the next row of virtual table 36, i.e., the row below the current position of window 38 (86). When the presentation model is adjusted, browser 33 refreshes the display of client-device 32 (88). In this manner, the user can scroll viewable window 38 throughout virtual table 36 without requiring interaction with data access system 12.

Figure 10:
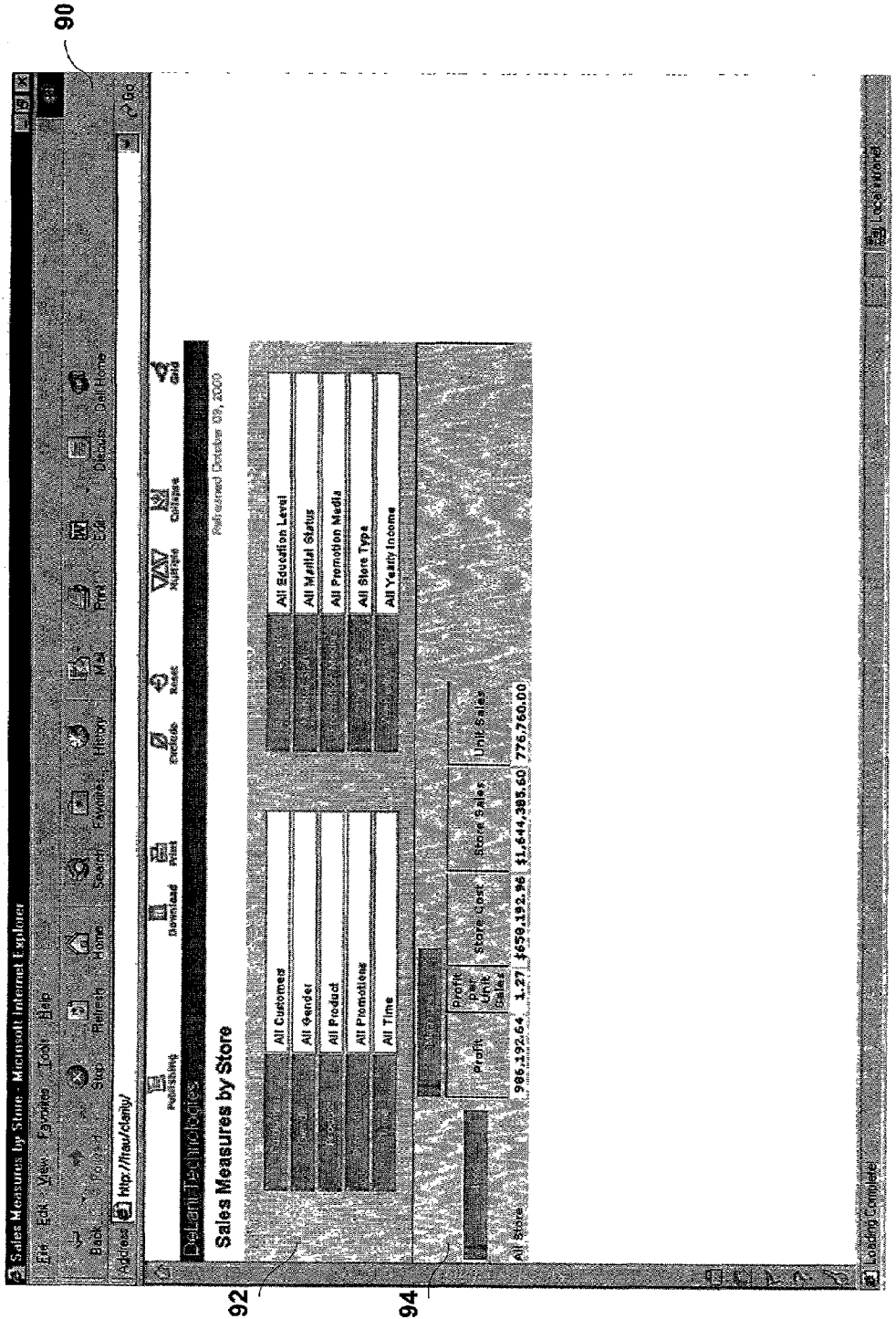
FIGS. 10 through 28 illustrate an example web-based user interface of the data access system by which the user can compose a report from a defined data cube.

FIGS. 10 through 19 illustrate an example web-based user interface of data access system 12 by which user 4 composes a report from data cube 17. FIG. 10 illustrates an example web page 90 presented by data access system 12 upon receiving a request to compose a new report. Web page 90 includes filter area 92 from which the user 4 selects one or more dimensions to include in the report. Filter area 92 lists all of the dimensions for the selected data cube 17 including, for example, Customers, Gender, Product, Promotions, Time, Educational Level, Marital Status, Promotion Media, Store Type and Yearly Income. Web page 90 also includes layout area 94 for defining the dimensions to be included in the composed report. For example, layout area 94 lists one active dimension, Store, and a number of a number of measures for the dimension: Profit, Profit per Units Sales, Store Cost, Store Sales and Unit Sales. In order to construct a report, a user 4 simply selects a dimension listed in filter area 92 and drags the dimension to layout area 92.

Figure 11:
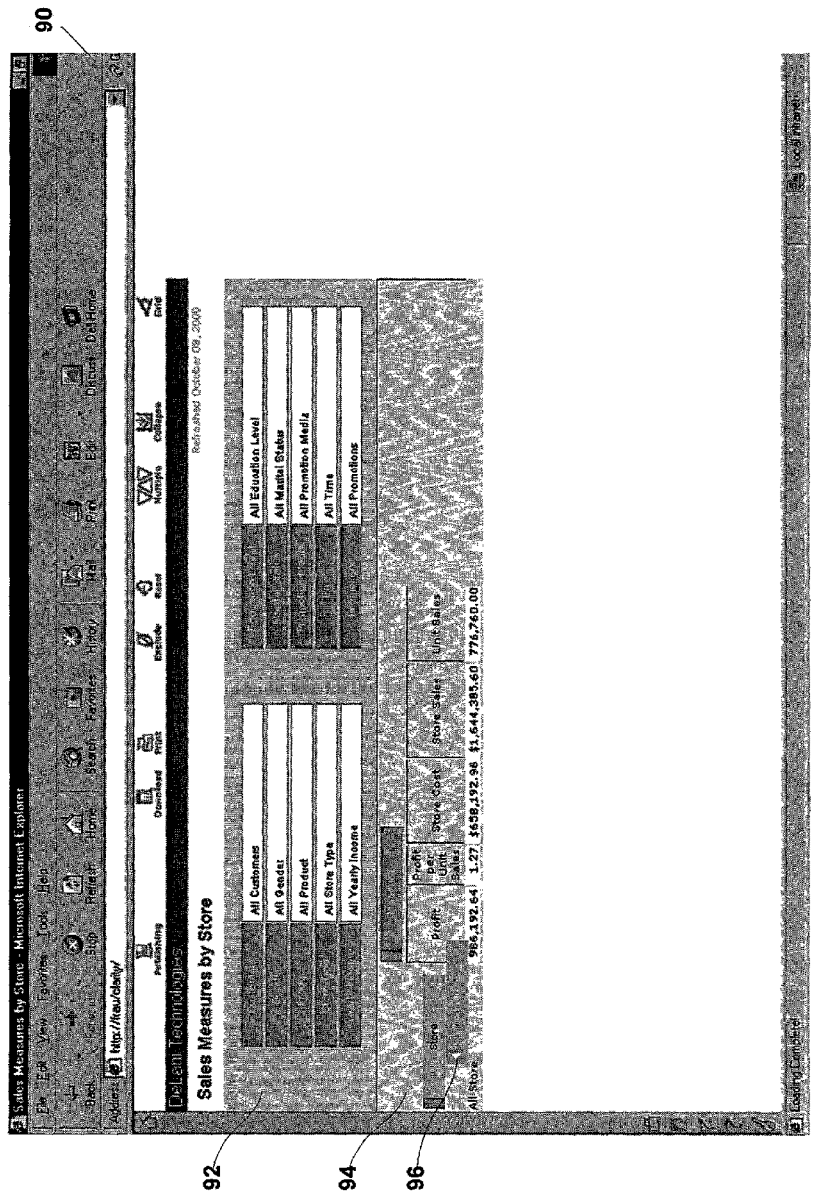
Figure 12:
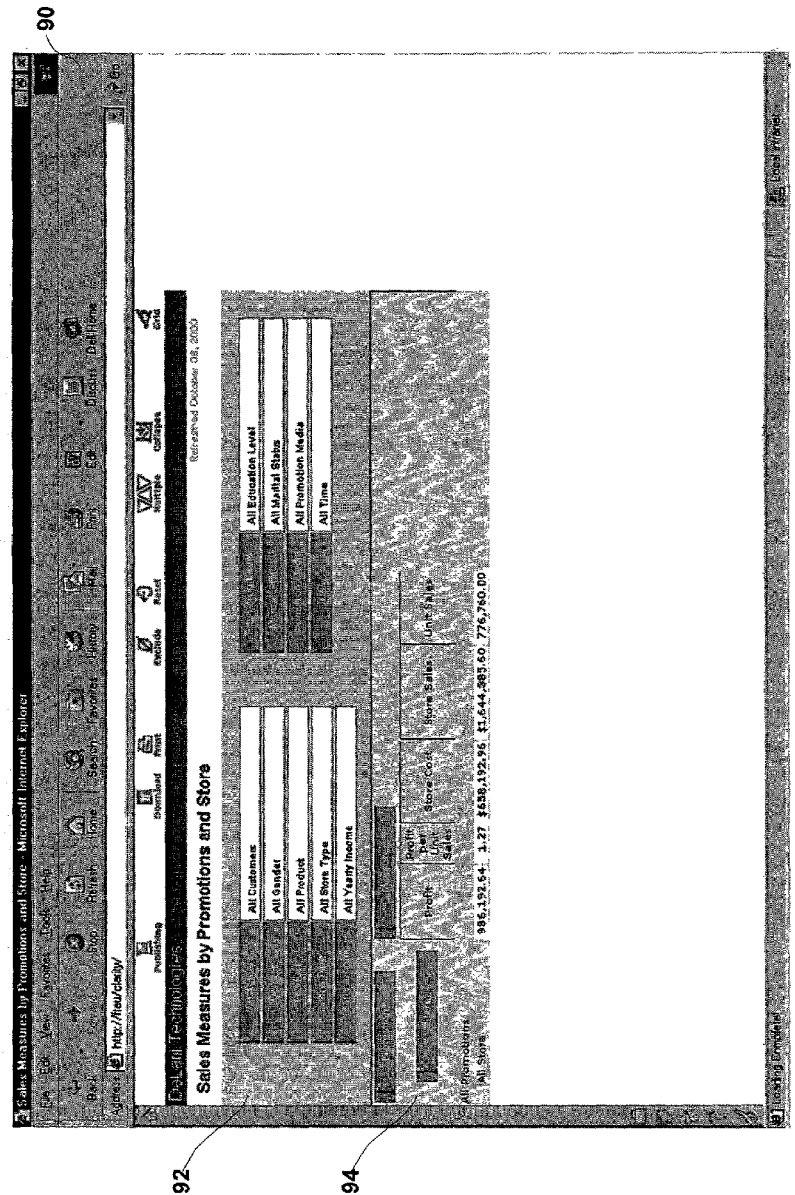

FIG. 11, for example, illustrates a "drag and drop" feature of the user interface when constructing a report. Here, user 4 has selected the Promotions dimension and is adding it to layout area 94, thereby making it an active dimension for the report. Layout area 94 displays the active dimensions in a nested fashion indicating their respective places in the dimension hierarchy. As displayed in web page 90, the current layout for the report defines a dimension hierarchy of Promotions within Stores. The direction of arrow 95 indicates where the dimension being added will be nested in relation to the currently active dimensions. As illustrated, arrow 95 points to the left meaning that the new dimension will be added above the active dimension, creating, for example, a dimension hierarchy of Stores within Promotions. After the dimension is added, user 4 can manipulate the hierarchy by simply rearranging the dimensions within layout area 94. FIG. 12 illustrates web page 90 once the Stores dimension has been added to layout area 94.

Figure 13:
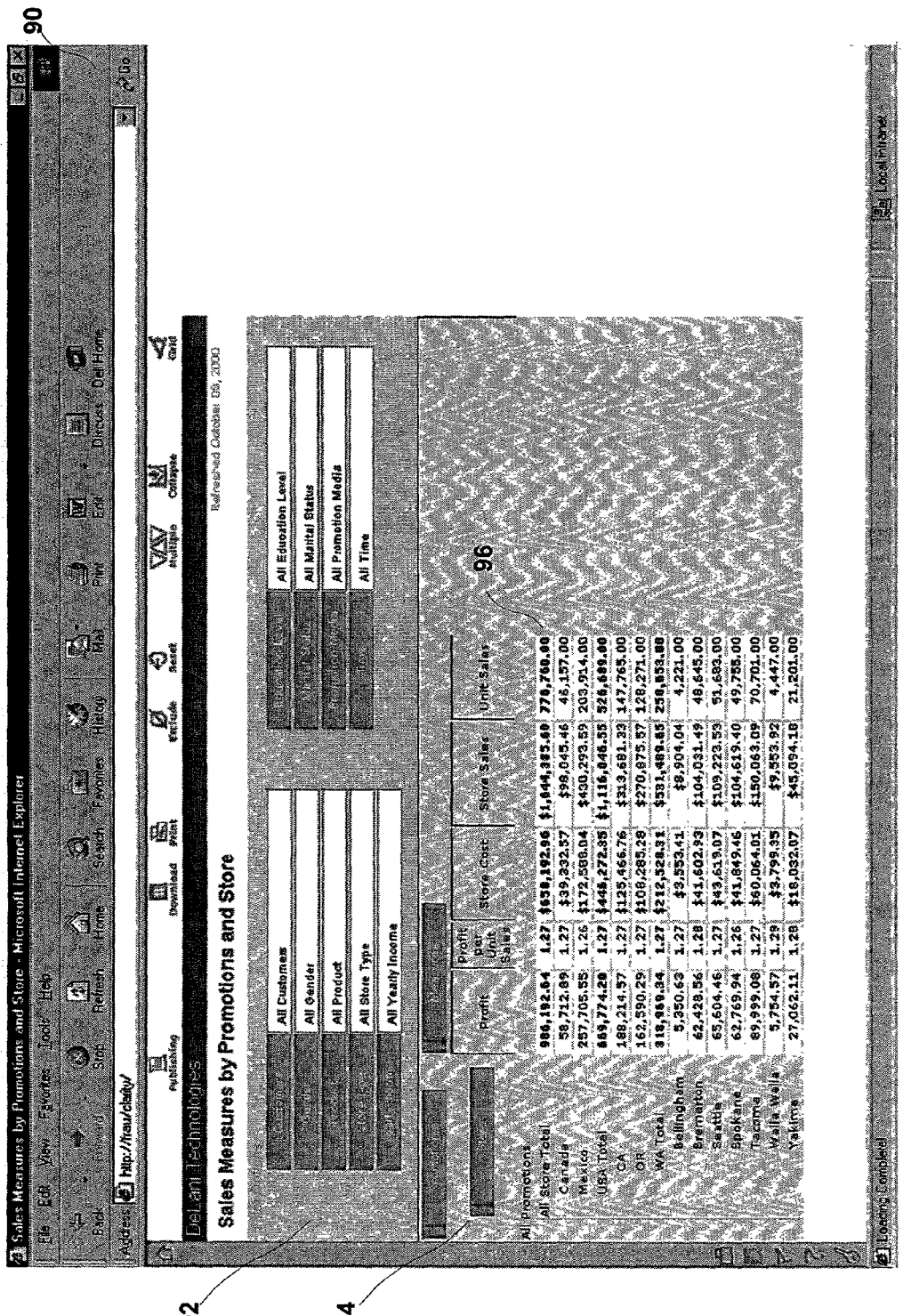

In addition to adding and removing dimensions, the user may interact with layout area 94 to expand or collapse any currently active dimensions. FIG. 13 illustrates web page 90 presented after the user 4 has elected to expand the Store dimension. Upon an expansion or collapse of a dimension, client-device 32 expands virtual table 34 (FIG. 5), as described above, and updates window 90 to accurately display viewing area 92 (FIG. 6) in data area 96. As illustrated in FIG. 13, the user has expanded the Store dimension by "drilling" into the All Store Total member, the USA member, the WA member, to show stores in cities in Washington. Data access system 12 allows the user to continue to expand into a dimension as far as the levels supported by data cube 17.

Figure 14:
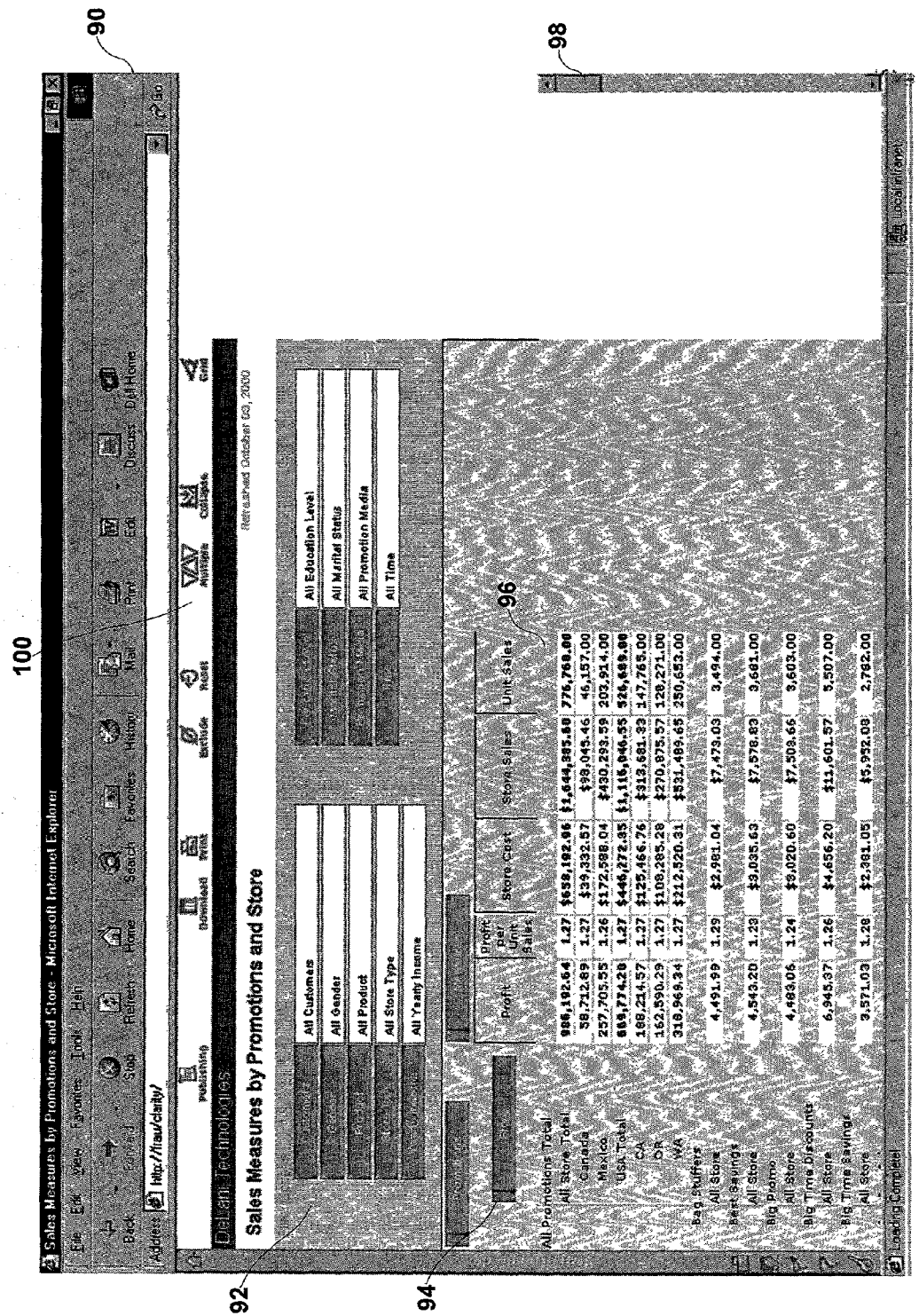

FIG. 14 illustrates the expansion of a second dimension, the Promotion dimension. Upon expanding the Promotion dimension, data area 92 is updated to include members for the Promotion dimension including Bag Stuffers, Best Savings, Big Promo, Big Time Discounts, etc. Data area 92 includes more rows than can be displayed by web page 90.

As such, page generation module 26 automatically generates web page 90 to include scrolling bar 98.

Notably, browser 33 does not generate scroll bar 98, as is typical in a web environment, but rather by page generation module 26 of data access system 12. This is advantageous for several reasons. Upon refreshing a page, the controlled scroll bar 98 allows the user interface to refresh the data to the exact point where the user previously was, without requiring that the user scroll down in order to return to his or her last position. In typical environments, when a page is refreshed the user is placed at the top of the data. Here, the entire page is built by data access system 12, including scroll bar 98, and the location of the data presented in the scroll window. As described above, data access system 12 maintains state data 29 to independently track the row and column location of the user.

The user interface presented by storage access device 12 can operate in several modes including a single mode and a multiple mode for expansion and collapse operations. Window 90 displays a multiple mode icon 100 indicating that data access device 12 is currently operating in single mode and that the user can toggle into multiple-click mode by pressing icon 100. In single mode, an expansion operation displays additional data in data area 96 for the individual member that is expanded. For example, as illustrated in FIG. 14, data area 96 displays additional data only for the All Promotions member when the user expanded the All Promotions member.

Figure 15:
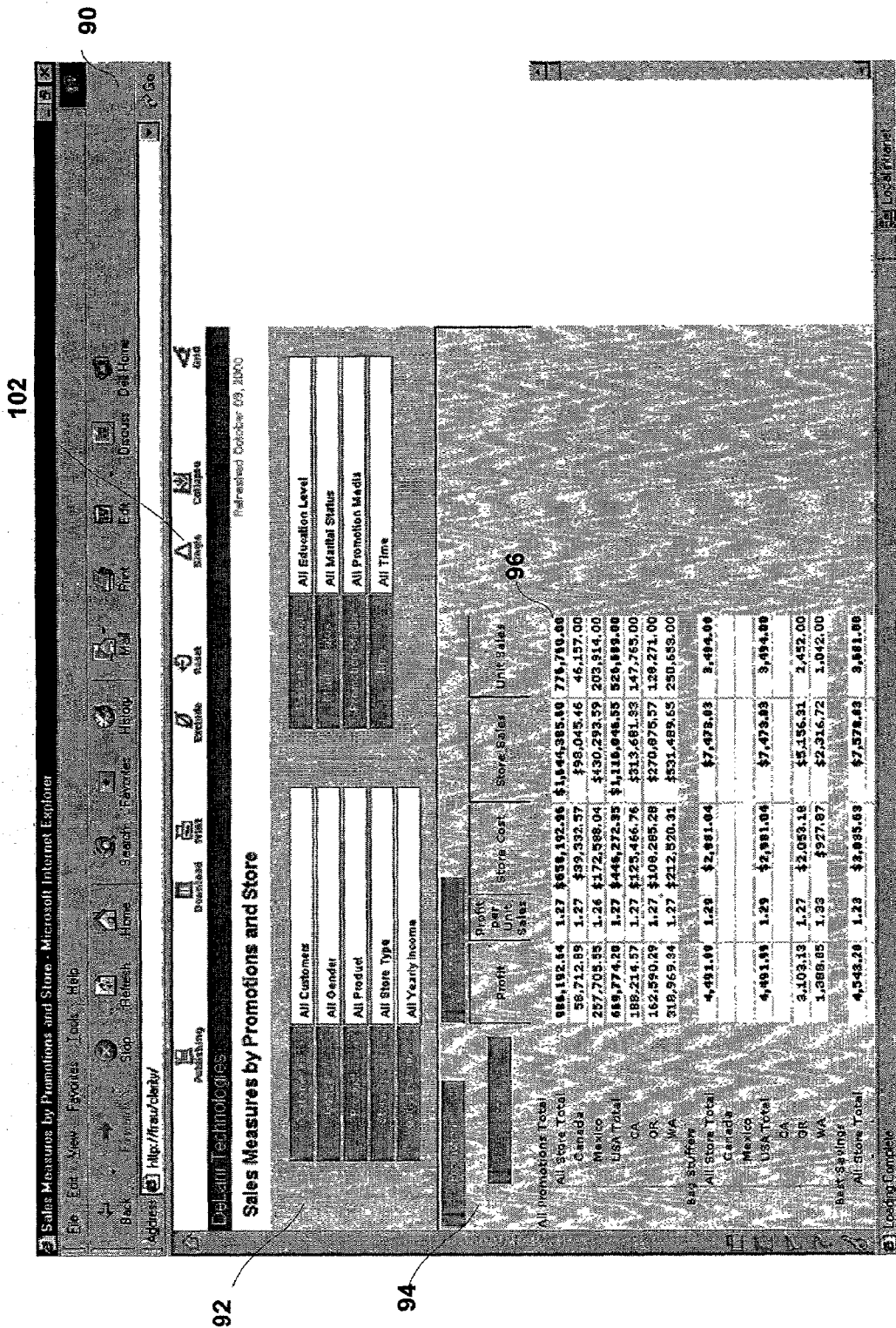

FIG. 15 illustrates an expansion when the user is in multiple mode, note the single icon 102 displayed by web page 90. In this mode, an expansion operation causes data area 96 to show Store detail for every member of the Promotion dimension when the Promotions dimension is expanded.

Figure 16:
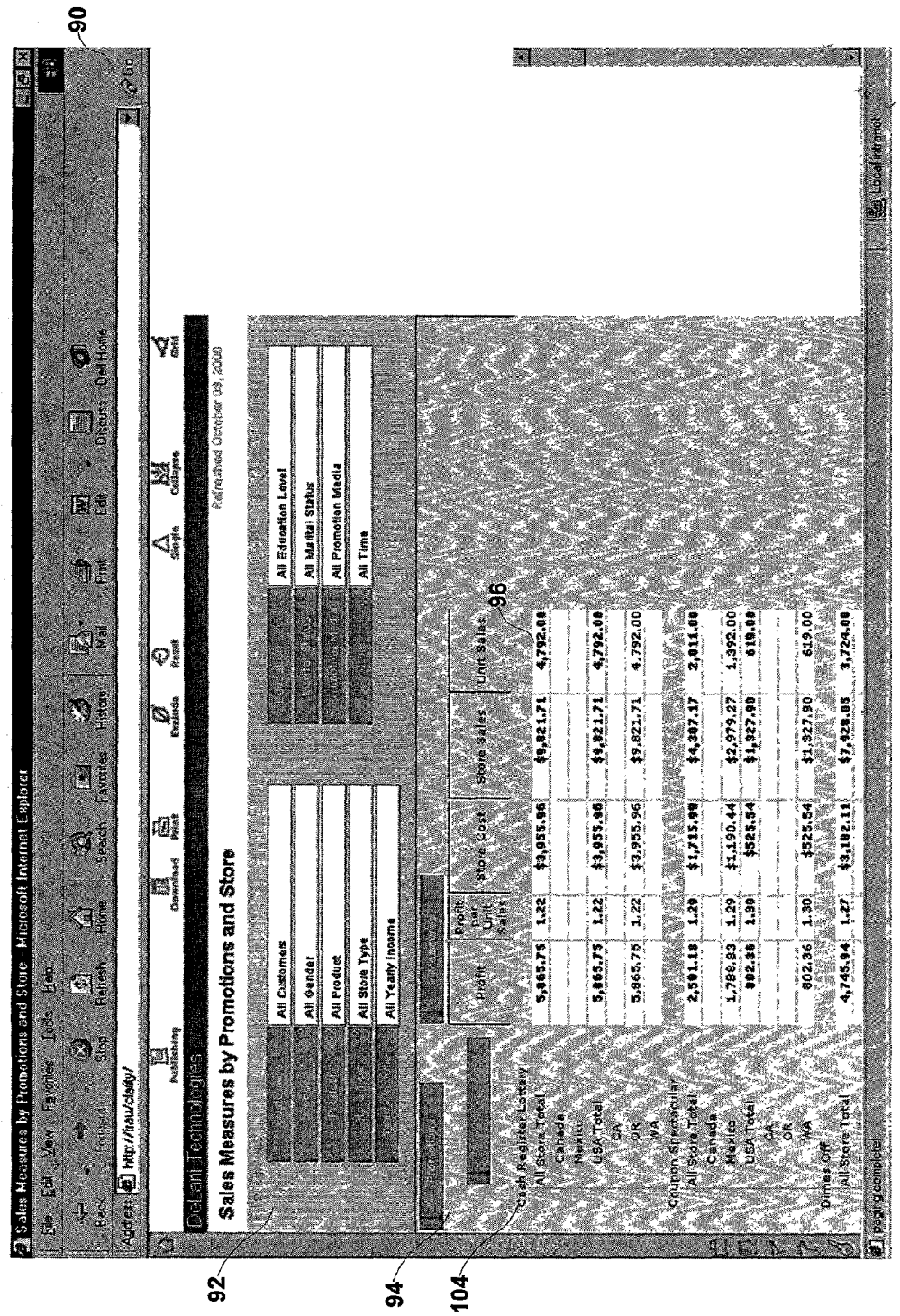
Figure 17:
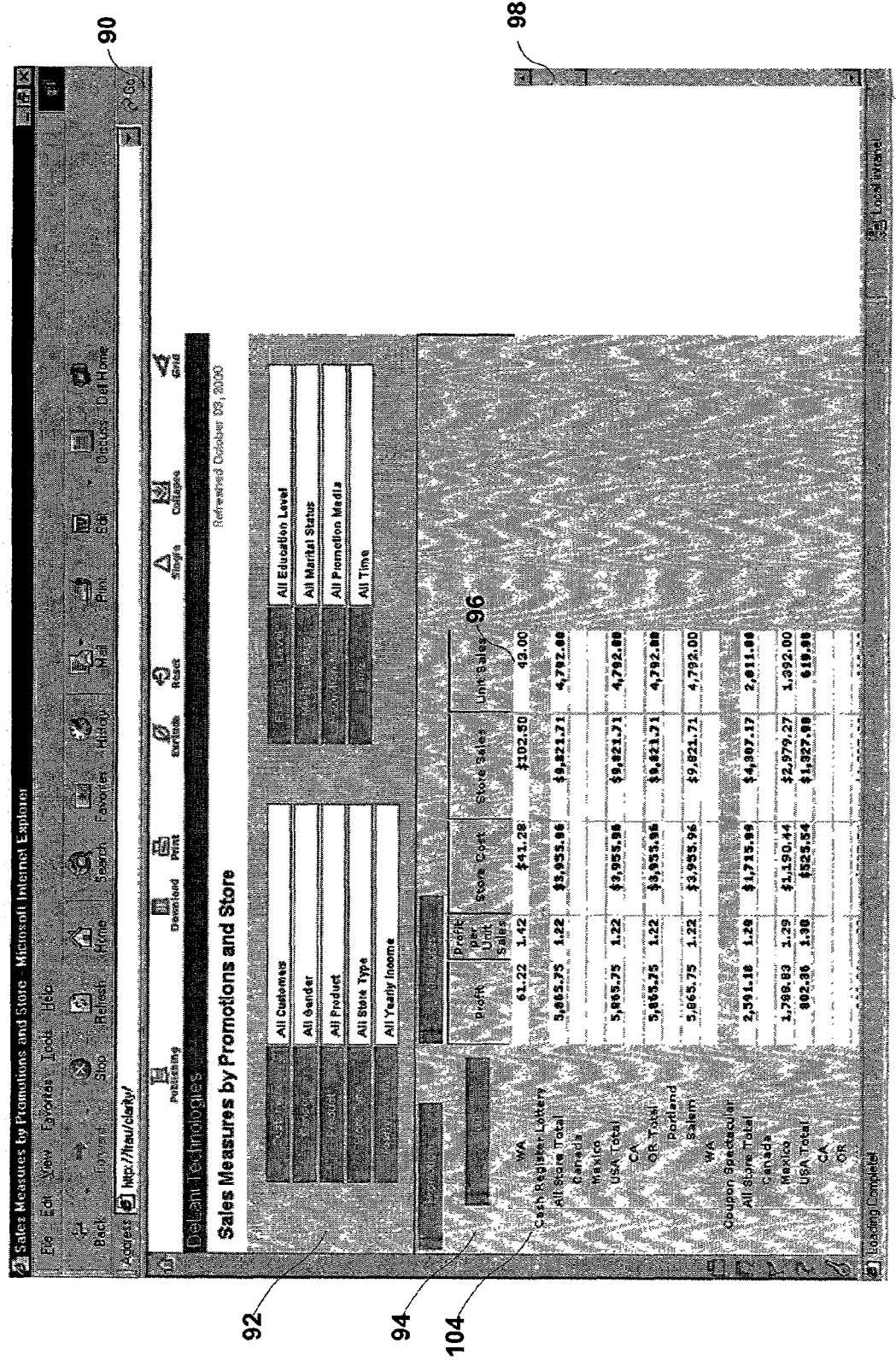

FIG. 16 illustrates the report as displayed by web page 90 after the user has scrolled down in the report and is about to expand further into the Store dimension. As discussed above, data access system maintains state data 29 to store information detailing the current position of the user within the report. Note, at this position, Cash Register member 104 of the Promotion dimension is currently at the top of the report. FIG. 17 illustrates web page 90 after the user have expanded in the OR member to show cities of Oregon. Notably, upon expanding into the member, page generation module 26 automatically generates web page 90 such that Cash Register member 104 is displayed at the same location, instead of returning to the top of the report as conventional applications. Furthermore, scroll bar 98 has been constructed to reflect the current position of the user, i.e., the position of display window 92 within virtual table 90 (FIG. 6).

Figure 18:
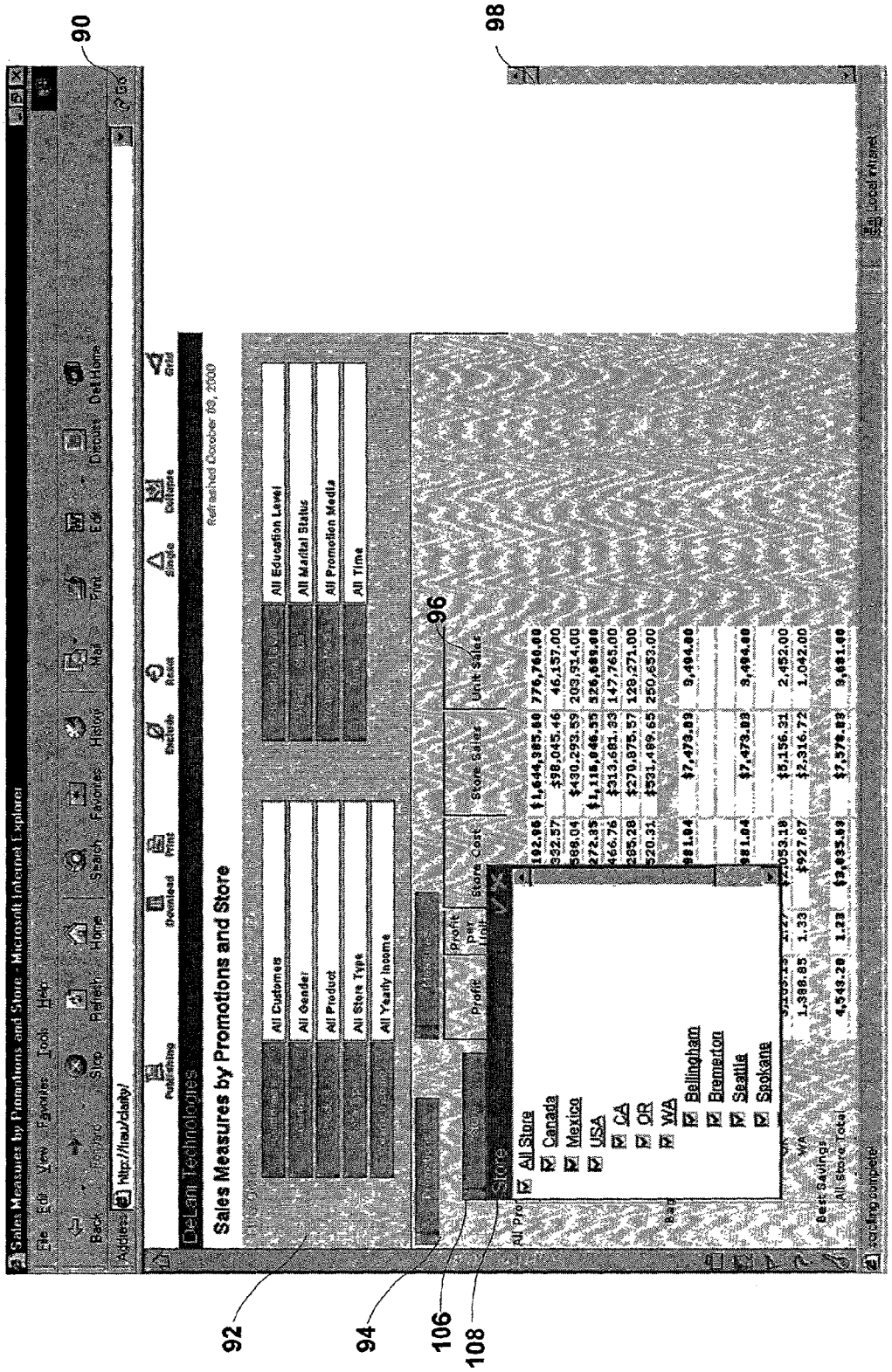

Another feature of the user interface allows the user to select and deselect individual members of a dimension, including parents, children, grandchildren, etc., for inclusion in the report. FIG. 18 illustrates web page 90 when the user has selected a left tab 106 of the Store dimension. When the user selects the tab 106, web page 90 displays a pop-up sub-filter window 108 by which the user can select and deselect members the Store dimension. Currently, the user elected to view all of the members of the Store dimension.

Figure 19:
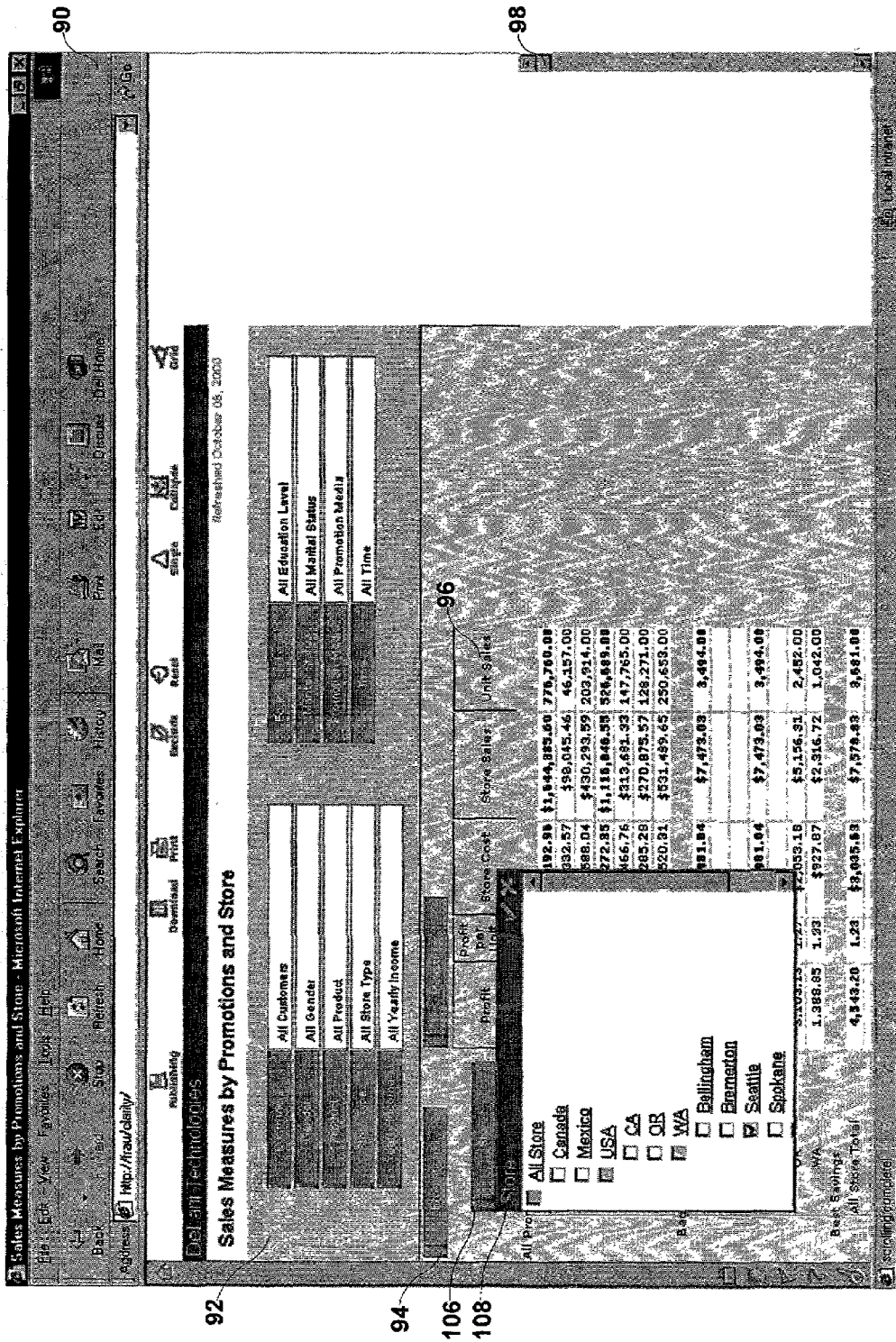
Figure 20:
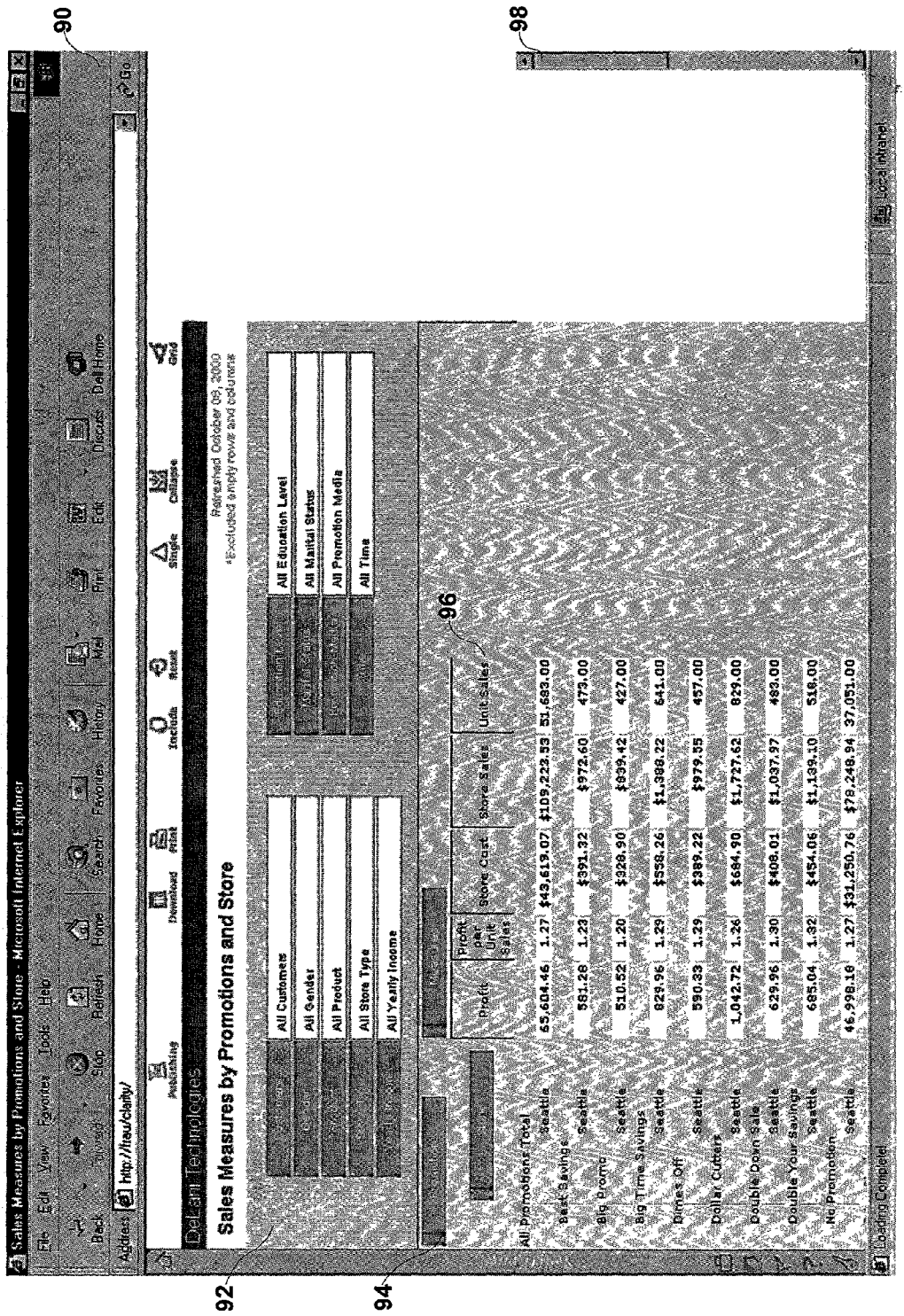
Figure 21:
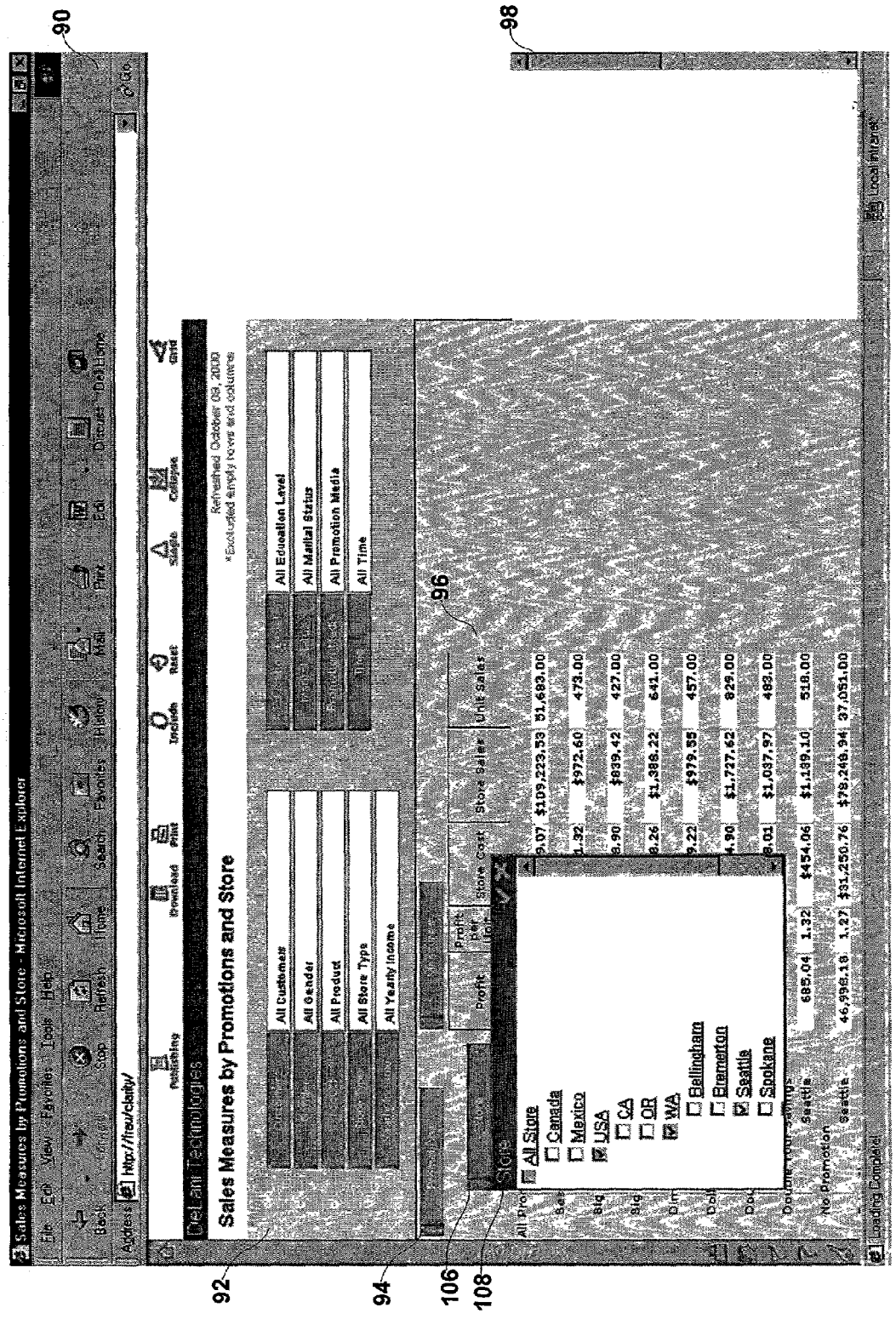
Figure 22:
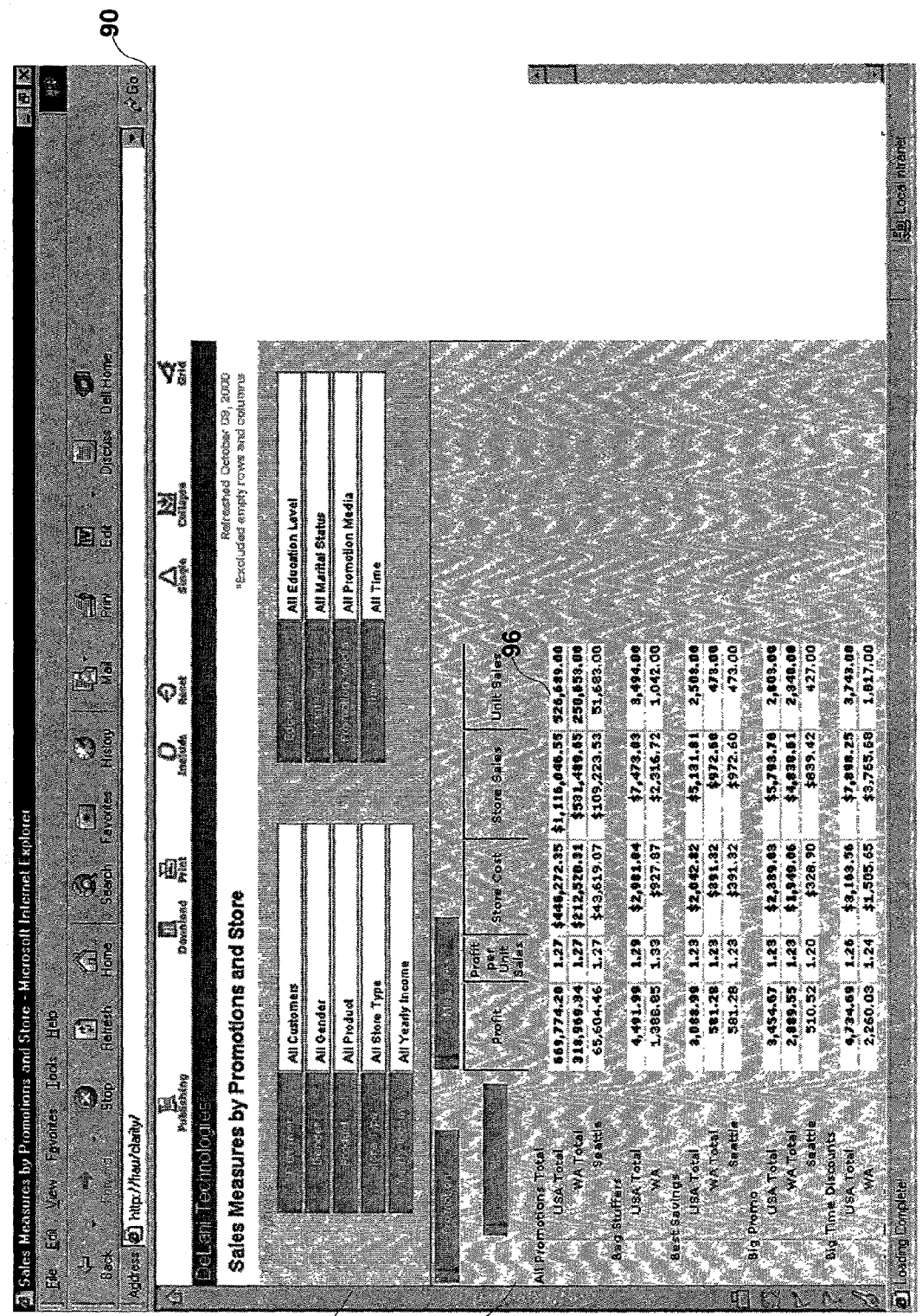

FIG. 19 illustrates the user interacting with sub-filter window 108 to create a narrow view of the data. Specifically, the user has selected only the Seattle member of the Store dimension to be displayed. Parent members WA, USA and All Store all have a grayed box that indicates at least one sub-member has been selected within the member structure, but that higher-level members have not been included. Similarly, empty boxes indicate those subtotals and all sub-members have been excluded. FIG. 20 illustrates web page 90 as generated by page generation module 26 based on the sub-filter settings. Notably, data area 96 displays promotional data from the Promotions dimension only for the Seattle member of the Location dimension. The user may select any combination of the members, as illustrated in web page 90 of FIG. 21, such as the Seattle member and then the WA member and the USA member. FIG. 22 illustrates web page 90 created by page generation module 26 after updating based on the current settings of sub-filter window 108 of FIG. 21.

Figure 23:
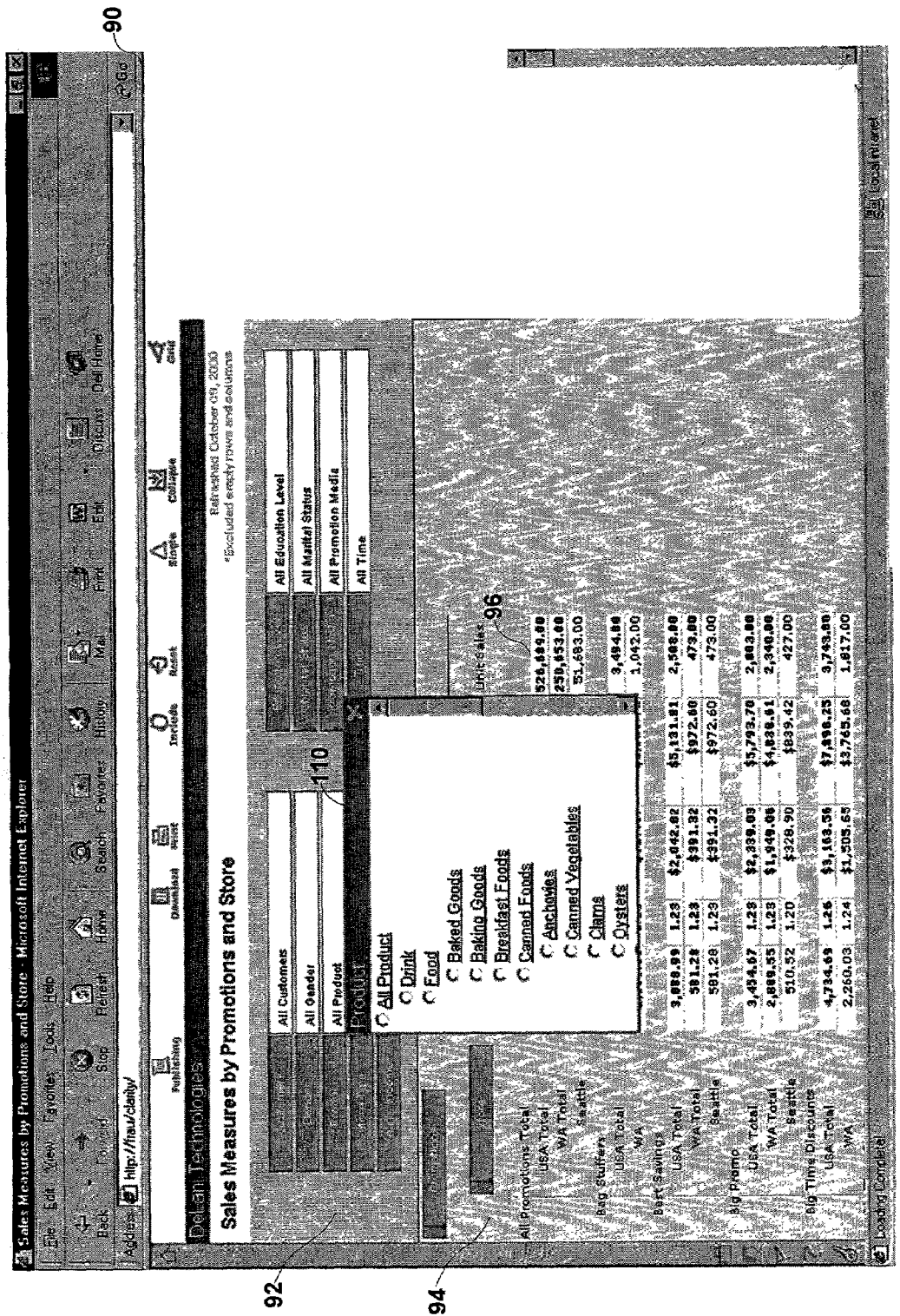

The user interface presented by data access system 12 supports similar filter capabilities for dimensions not currently active. FIG. 23 illustrates web page 90 when the user selects and displays filter window 110 for the Store Type dimension displayed in filter area 92. The filter functionality for dimensions that are not currently in the active is similar to the functionality as described above for dimensions listed in layout area 94. For any listed dimension, user 4 can select and view members and sub-members. Unlike sub-filter window 108 for active dimensions, filter window 110 allows the user to select one member or submember for a dimension. For, example, for the Store Type dimension the user could select the Clams member but not Anchovies member and the Clams member. If user 4 wants multiple selections, user 4 can activate the dimension by dragging the dimension down into layout area 94 and use sub-filter window 108.

Figure 24:
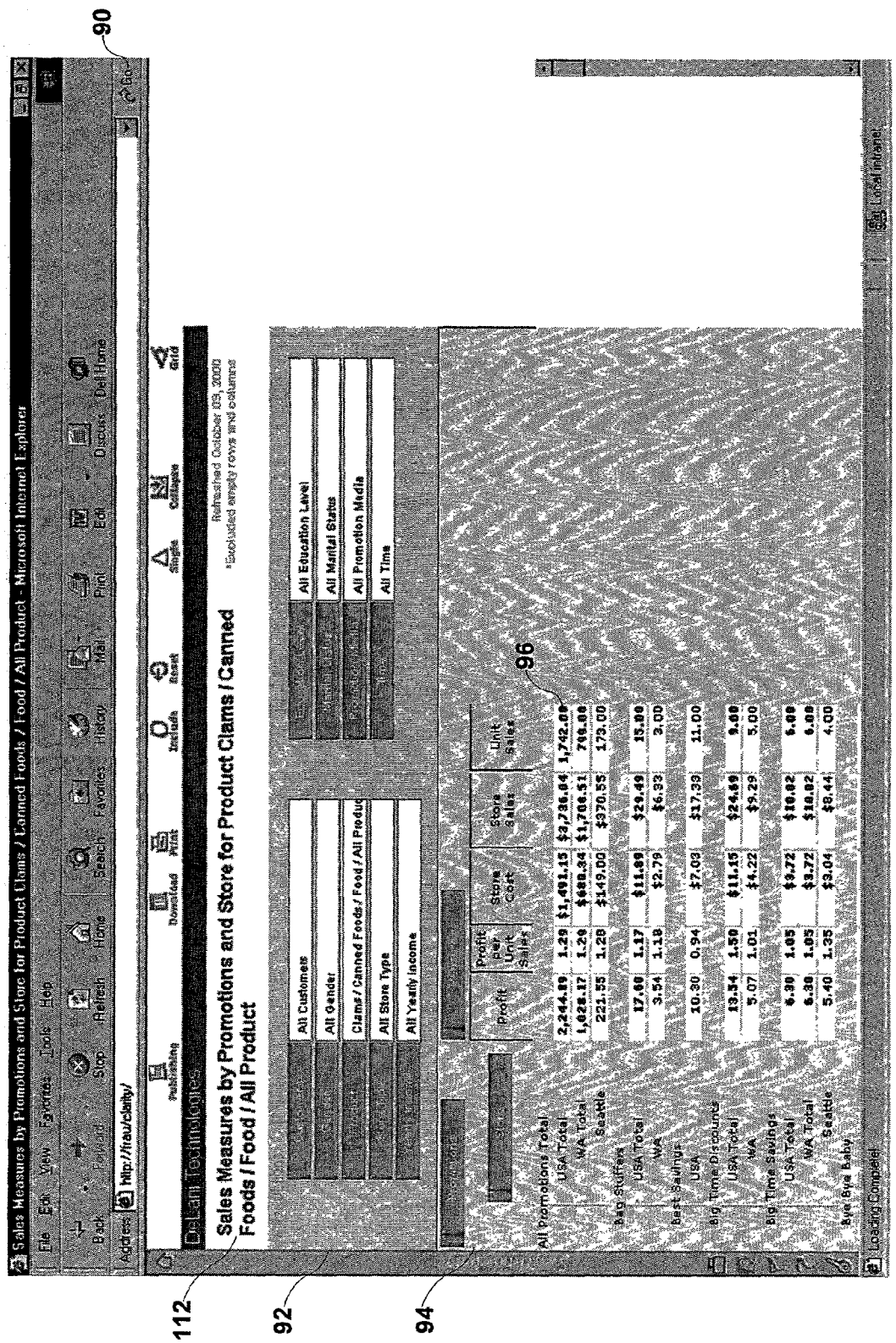
Figure 25:
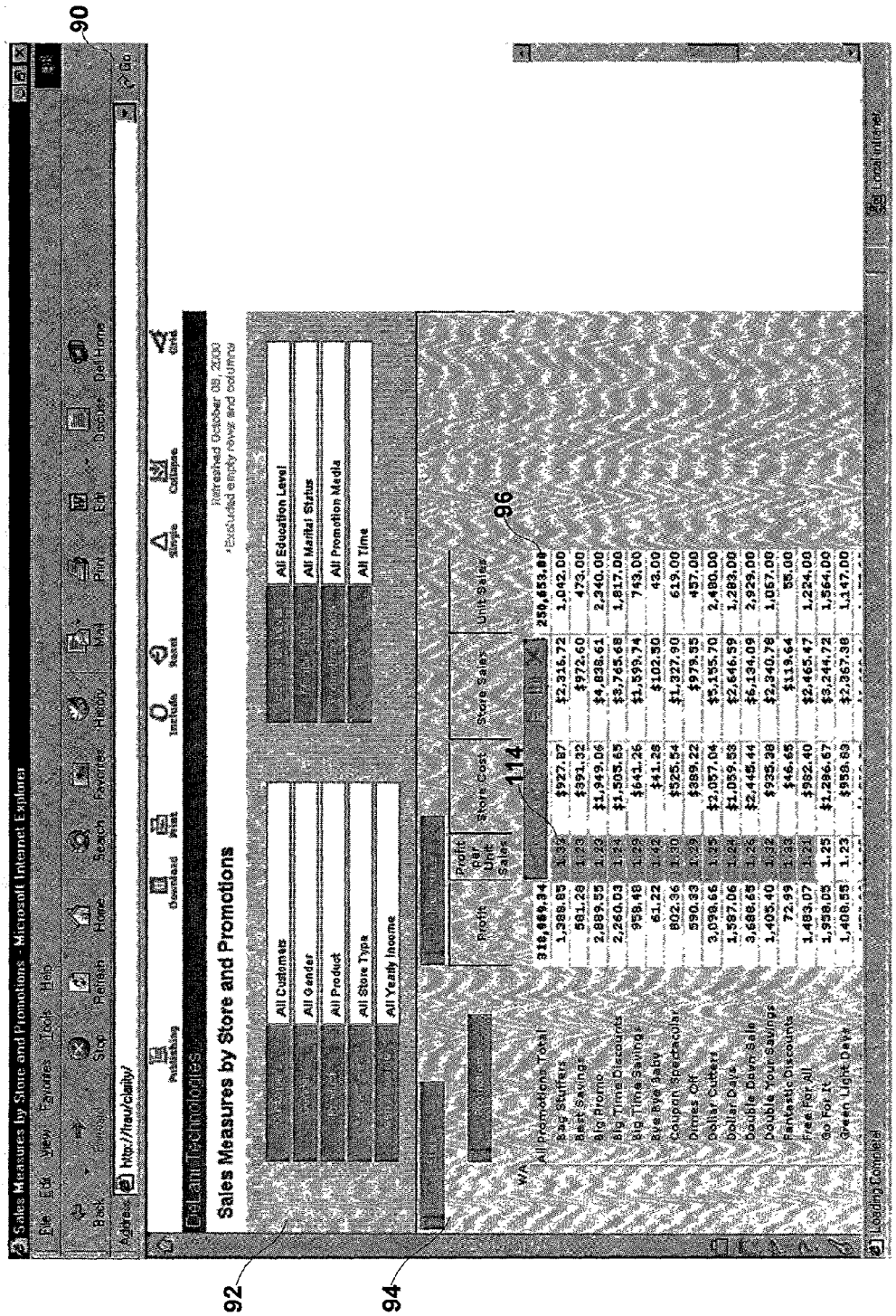

FIG. 24 illustrates web page 90 when the user has selected the Clams dimension form filter window 110. Based on the selected dimensions, page generation module 26 dynamically updates tile 112 of web page 90 to reflect the filter selections. Title 112 lists the dimensions used for measuring sales: Promotions and Store, as well as the selected members of the member hierarchy: Clams/Canned Foods/Food/All Products. Data area 96 reflects the filter selections and, because in this example page generation module 26 is set to exclude empty data rows, the user can easily tell that not every promotion has been used for clams in every store location.

Figure 26:
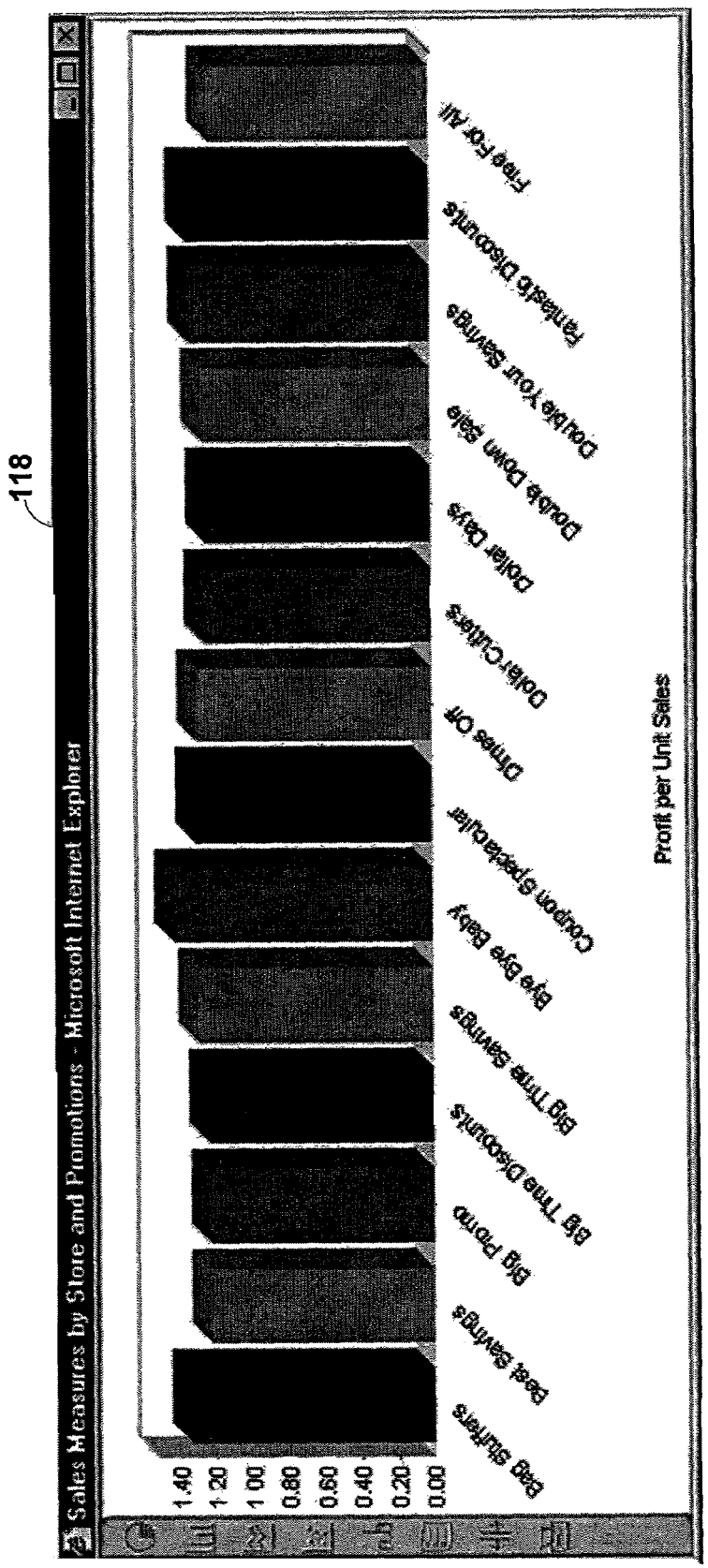

The user interface of data access system 12 has integrated graphing functionality that allows the user to easily generate graphs for the displayed data. FIG. 16 illustrates the user preparing to create an embedded graph for the report. Specifically, the user has swapped the Store and Promotion dimensions within layout area 94 and changed set the filter for the Product dimension to All Products. The user has also selected a range of cells 114 for use with the graphing functionality. Web page 90 highlights and the range of cells 14 and displays Select Function box 116, which offers several types of available charts or other functions. FIG. 26 illustrates a graph 118 generated by the user interface and displayed to the user for the selected range of cells 114.

Figure 27:
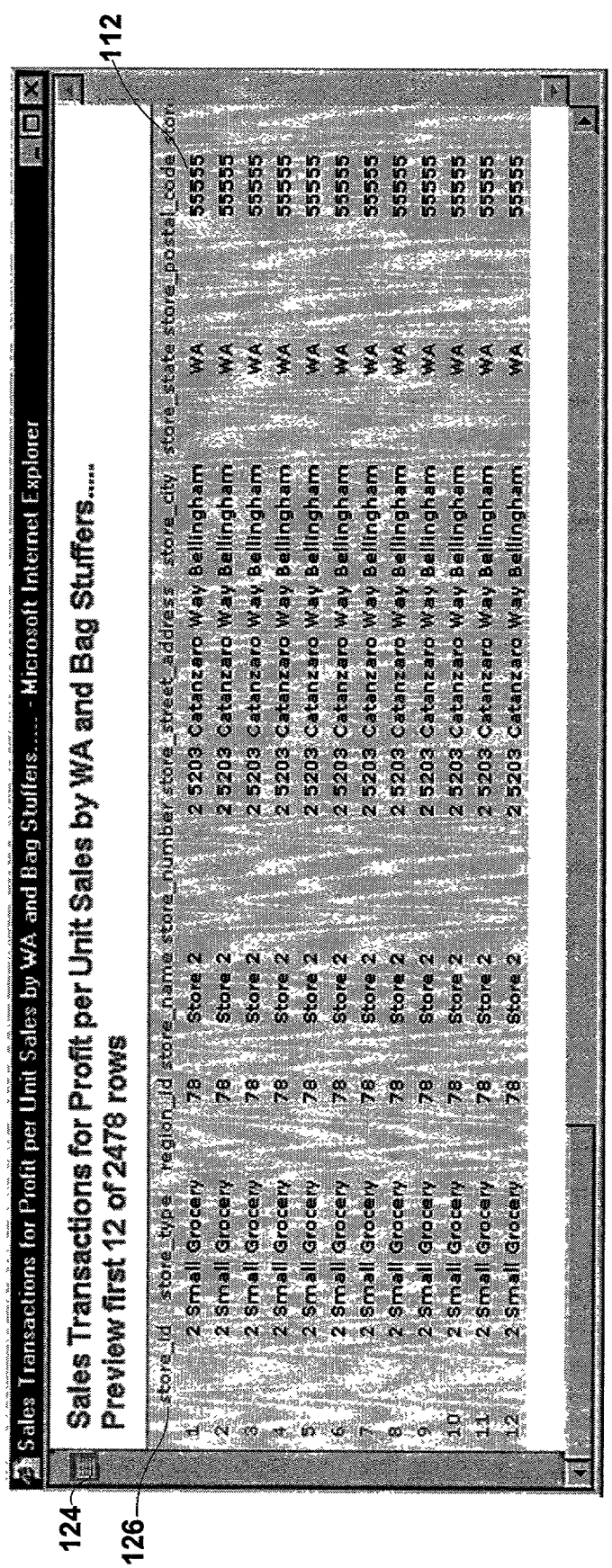

In addition to creating charts from selected data ranges, the user can elect to view the underlying transactional data 16 (FIG. 2). Similar to charting functions, the user selects a data range 114, but selects transactions from Select Function box 116 instead of a charting option. In response, the data access system 12 identifies the corresponding tables within transactional data 16 and retrieves records of the transactional data underlying the multidimensional data. FIG. 27 illustrates a window 120 that lists records 122 retrieved from transactional data 16 that correspond to the selected range of cells 114. Window 120 includes column headings 126 for the data fields of the records. In one embodiment, the headings are dynamically created based on the field names within the corresponding tables of transactional data 16. By selecting icon 124, the user can download the displayed records to client-device 32 in a variety of formats, such as tab-delimited or spreadsheet format.

Figure 28:
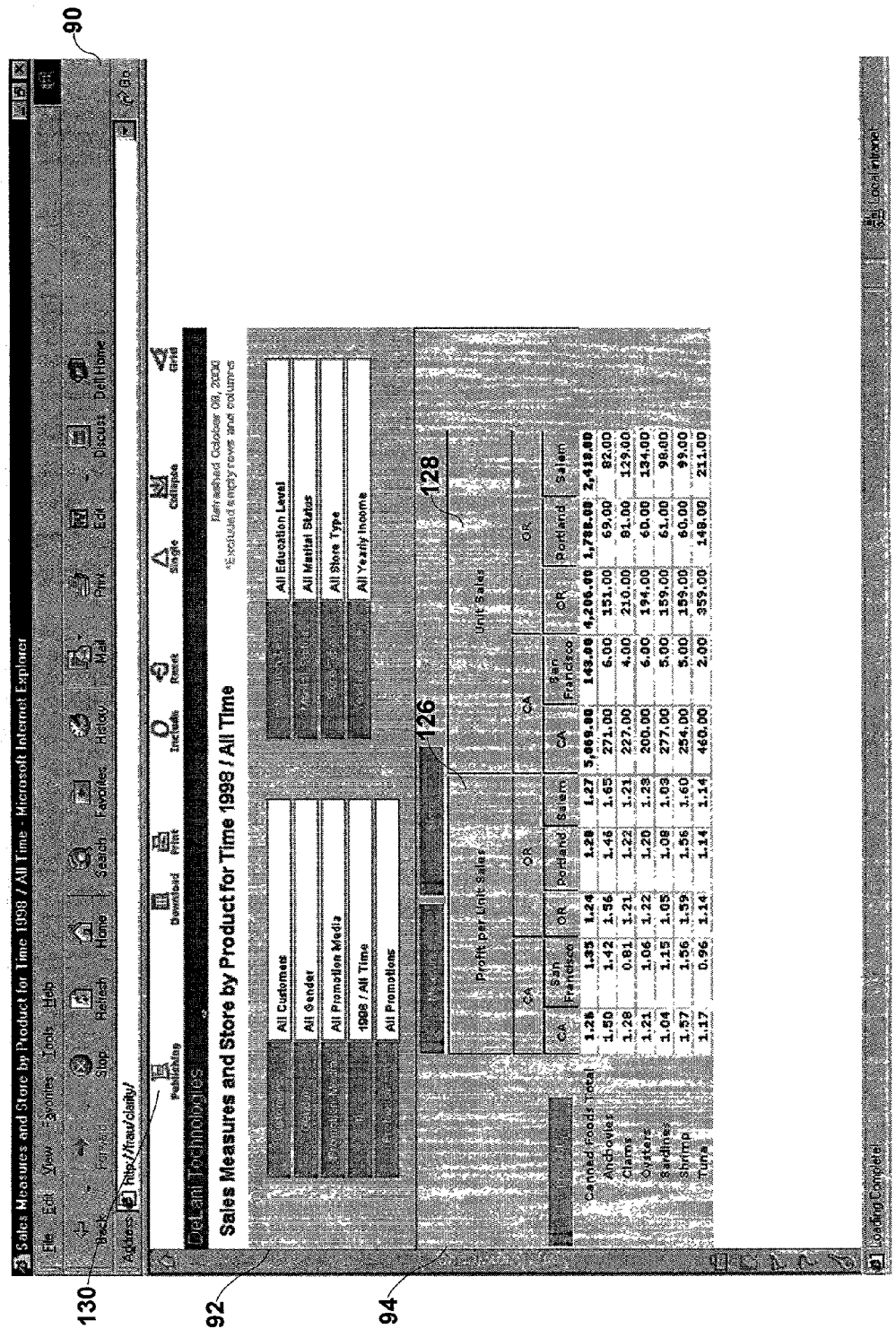

As described above, the user interface allows the user to easily and efficiently create and manipulate complex reports. For example, FIG. 28 illustrates a report in which the user has used sub-filters for the Measures dimension to select two measures: Profit per Unit Sales 126 and Unit Sales 128. The user has also used a sub-filter to: (1) select the OR member of the Store dimension, (2) select the San Francisco member and display a CA subtotal, (3) selected the Meat Products member within the Canned Foods member of the Product dimension, and (4) filtered on Time to select 1998. After creating a report, the user can "publish" a report, thereby making is available to other users 4 simply by clicking on the publishing icon 130.

Figure 29:
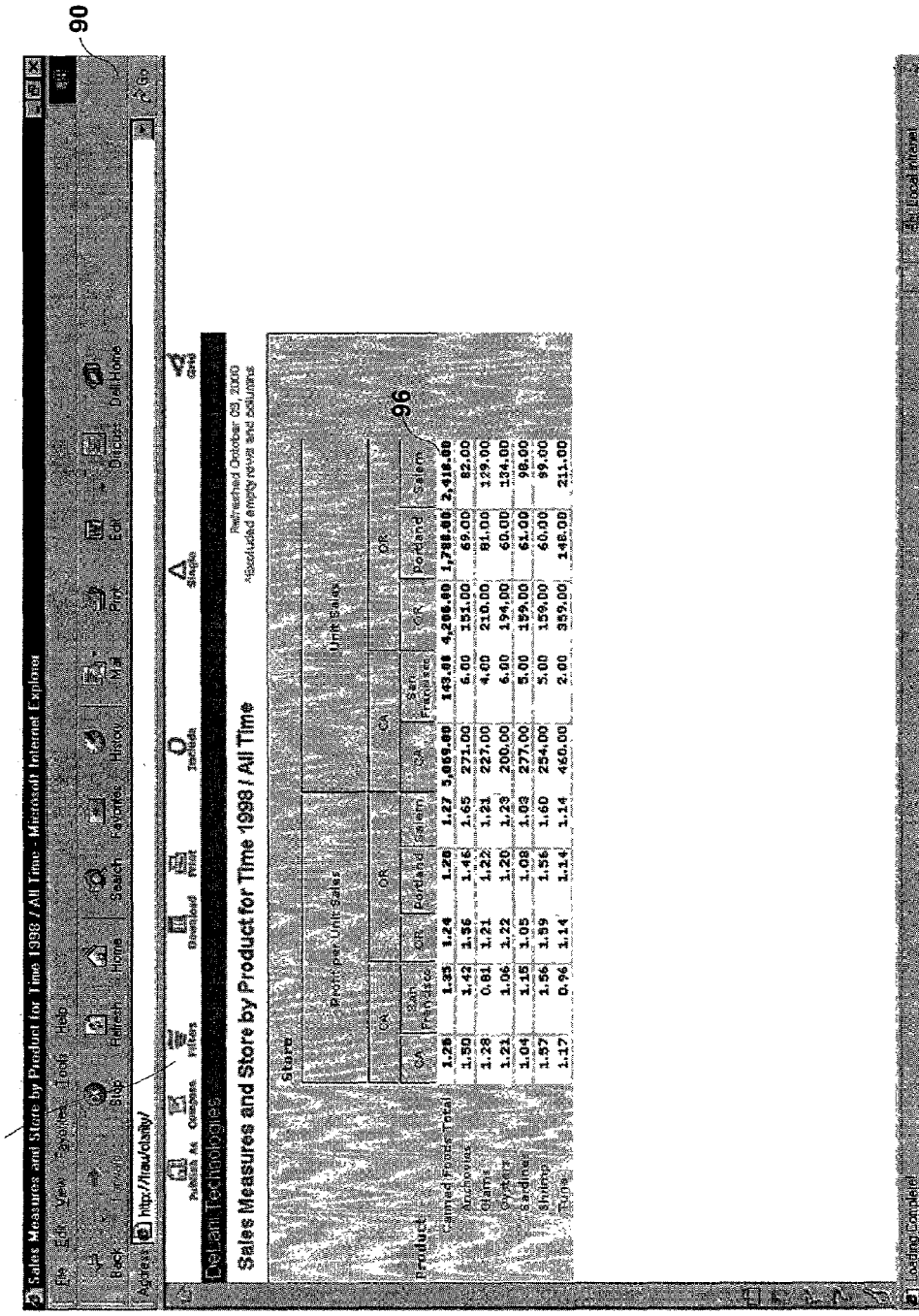
FIGS. 29 through 33 illustrate the user interacting with the user interface of the data access system to publish a report for access by other users.

FIGS. 29 through 34 illustrate the user interacting with the user interface of data access system 12 to publish a report for access by other users 4. FIG. 29 illustrates a web page 132 after the user has transitioned from compose mode to publish mode by clicking publishing icon 130 (FIG. 19). Web page 132 includes a number of changes from web page 90 when the user was creating a report. Filter area 92 has been removed such that the user cannot add or remove dimensions. Furthermore, the active dimensions no longer have tabs for changing sub-filter selections. In addition, the user cannot rearrange the dimension hierarchy of the report by dragging and dropping the dimensions. Data area 96 displays the data in rows and columns, as displayed while the user was composing the report.

Figure 30:
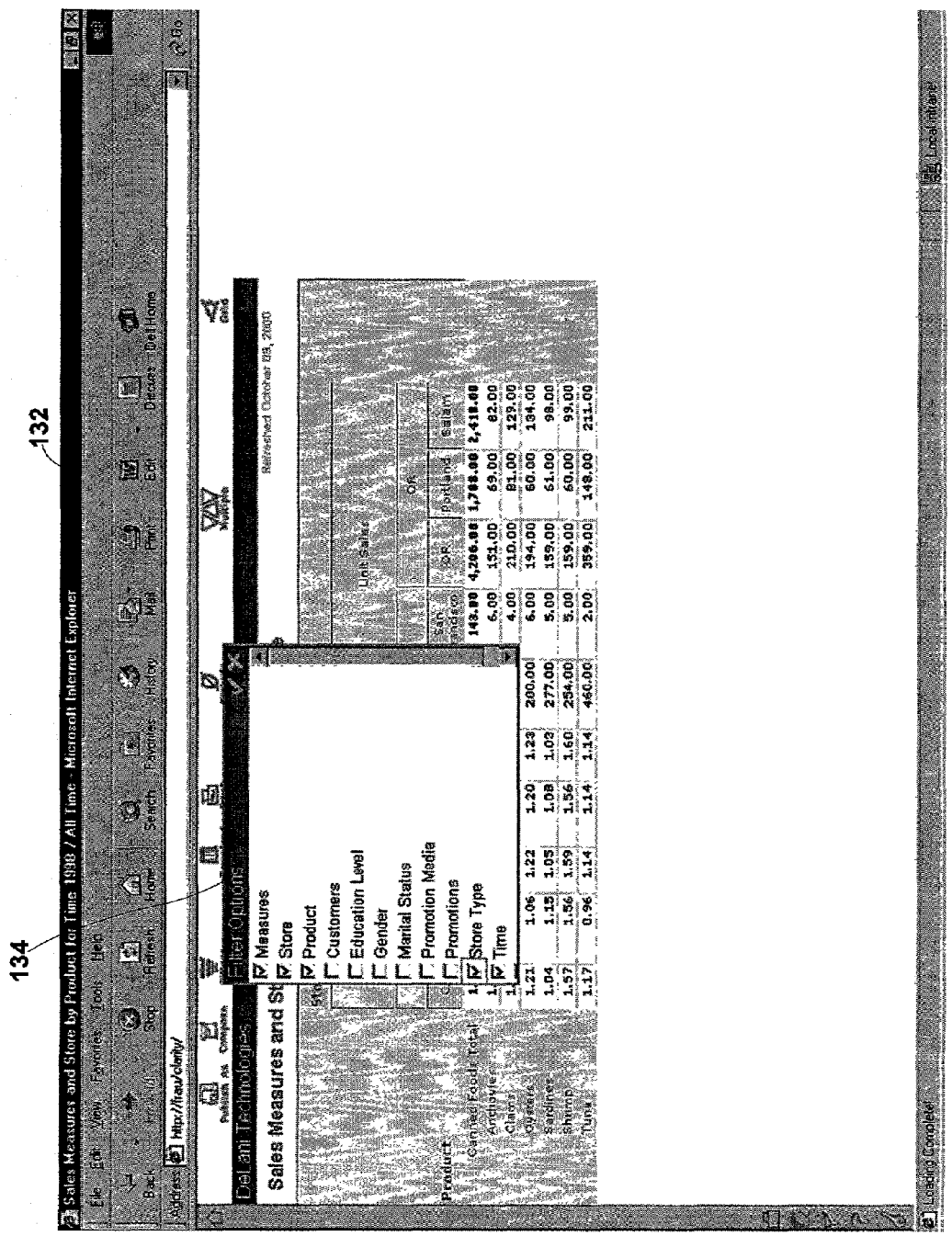
Figure 31:
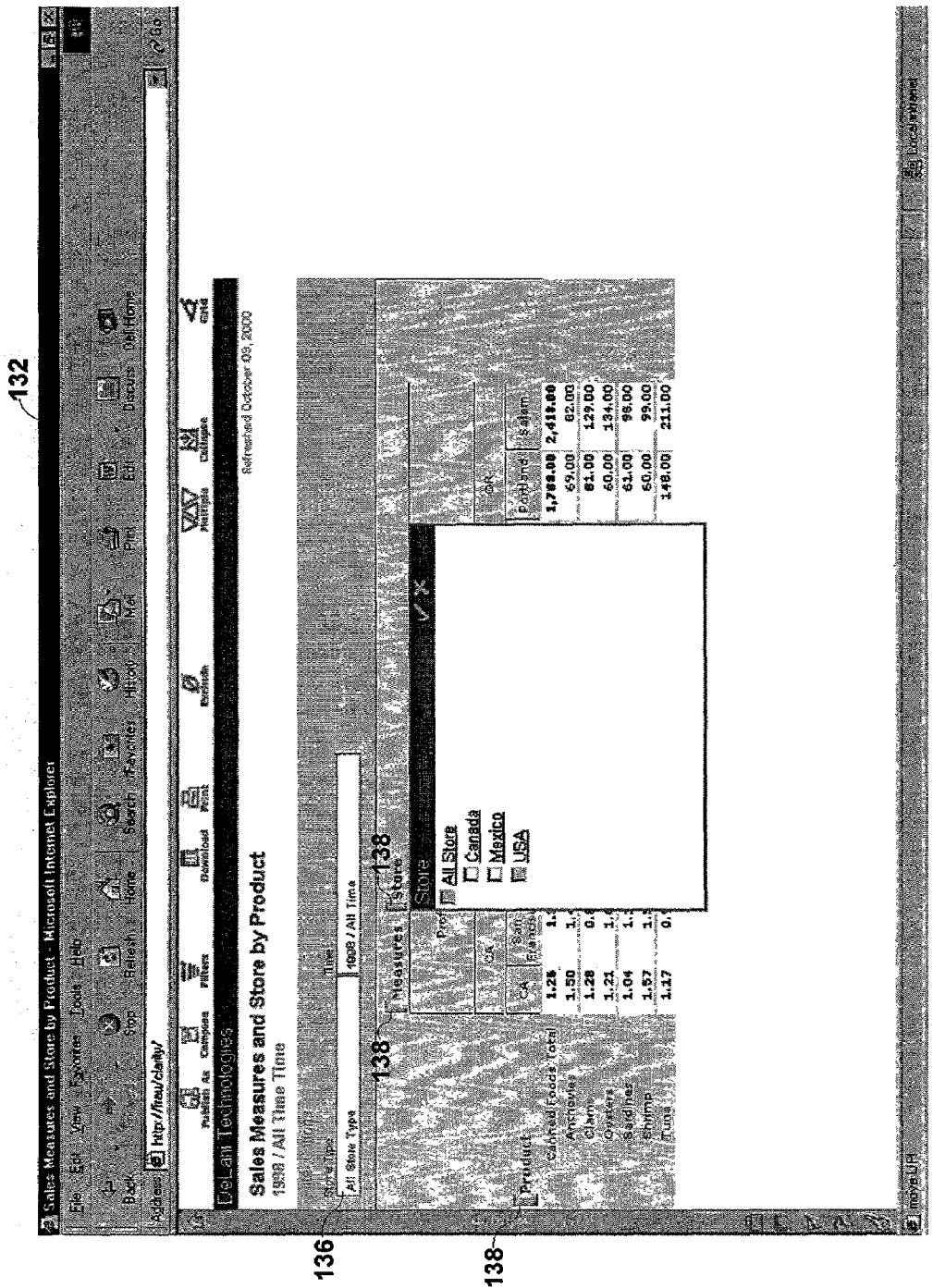

The user can incorporate filtering options into the report by selecting the filter icon 134, thereby making selective filtering available to other users when the report is published. FIG. 30 illustrates the web page 132 when the user has selected filter icon 134. The user can add filter and/or sub-filter capabilities back into the report before publishing to other users by selecting from the list of dimensions. FIG. 31 illustrates web page 132 as updated based on the new filtering capabilities. Web page 132 now includes filter selection window 136 by which the user can select filters for the active dimensions. In addition, the active measures and dimensions now have filter selection buttons 138 that allow sub-filtering on the active dimensions and measures.

Figure 32:
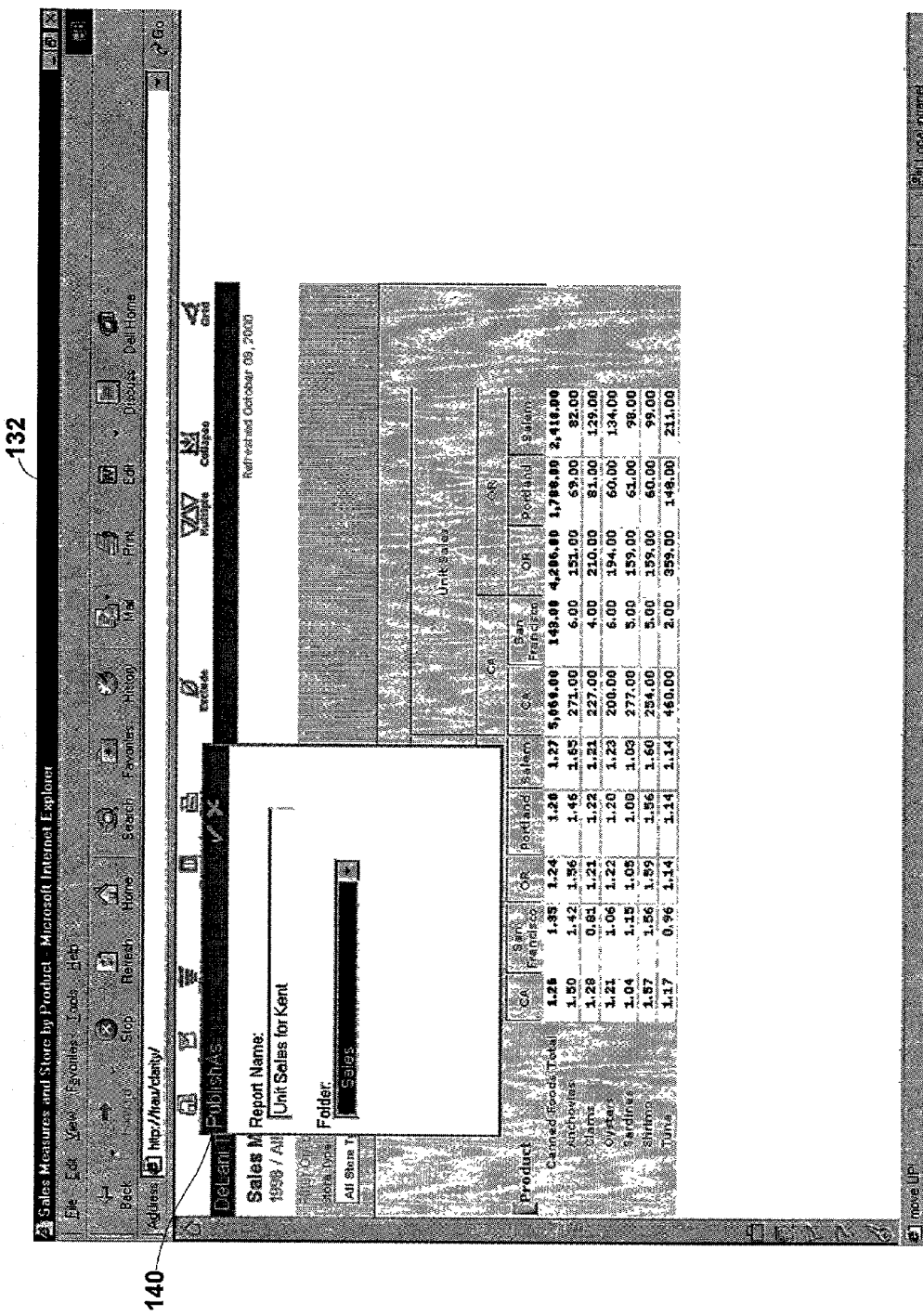

As illustrated in FIG. 32, once the report is ready for publishing, the user can select the publish icon to display publish window 140. The user then provides a name for the report as it will appear to other users 4 that access data access system 12 via network 8. In addition, the user can select a folder in which he or she wants to save the report.

Figure 33:
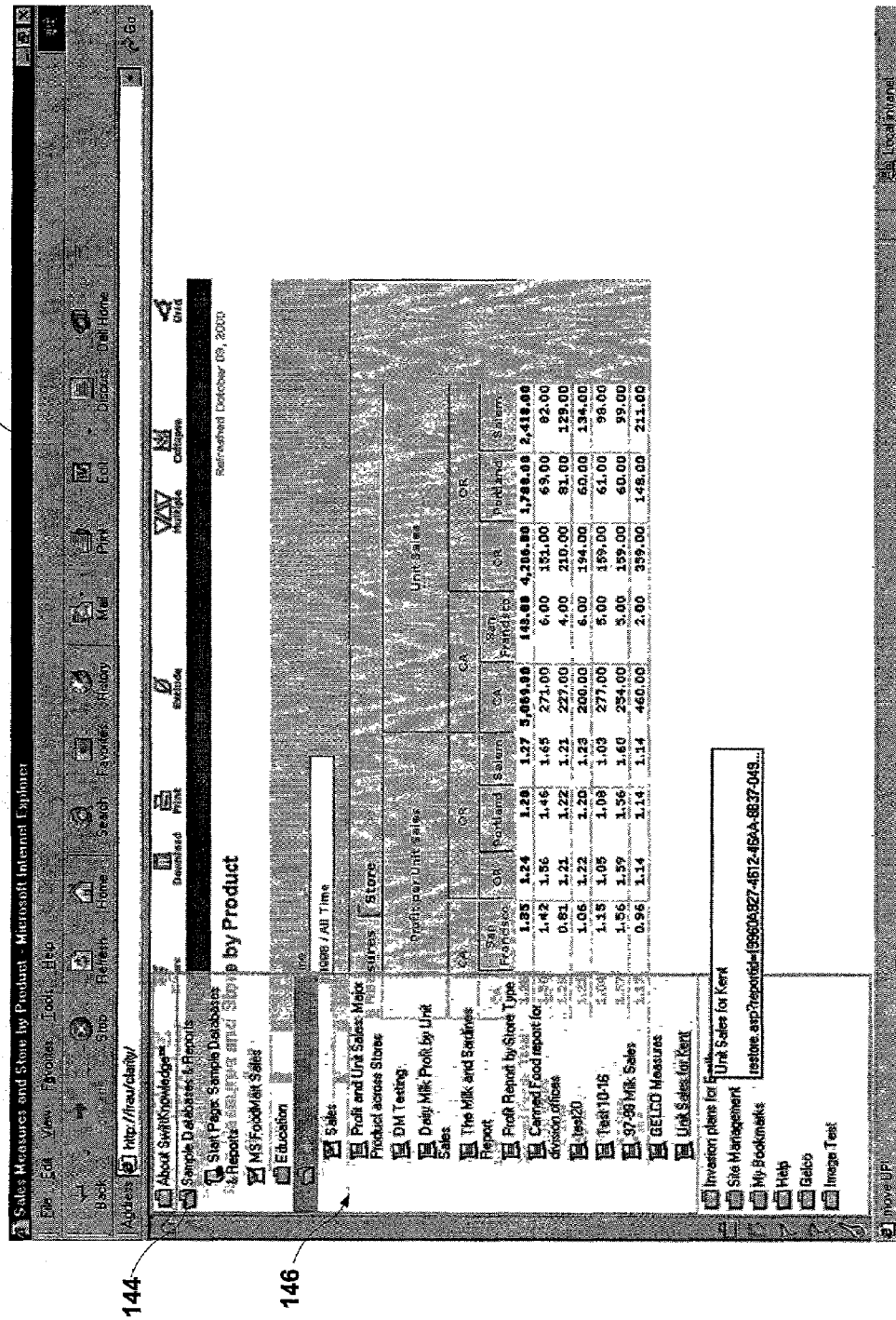

Once a report is published, other authorized users 4 can immediately access the report via data access system 12. FIG. 33 illustrates a web page 142 in which a selection window 144 is displayed listing the available folders and reports maintained by data access system 12. The user, however, may elect not to publish a report for use by other, but maintain the report for his individual use. For example, the user can elect to bookmark the report as it currently is viewed and then save that within personal bookmarks on the server. Server-based bookmarks are advantageous in that the user can access them when he or she travels, as opposed to desktop-specific bookmarks.

Data access system 12 provides a number of security measures for providing a highly secure environment in which to share data. For example, data access system 12 allows a user to define groups of users and map the groups to different views of a given data cube 17. In other words, a user can define the viewable dimensions of a data cube 17 for each user group. In addition, while composing a report, the user can identify which dimensions may be configured by a user while viewing the report. For example, while composing the report, the user can define which dimensions may be filtered and sub-filtered by users viewing the report. FIGS. 34 through 41, for example, illustrate various security mechanisms that allow users to set access rights to the multidimensional data and the underlying transactional data from which the multidimensional data was derived.

Figure 34:
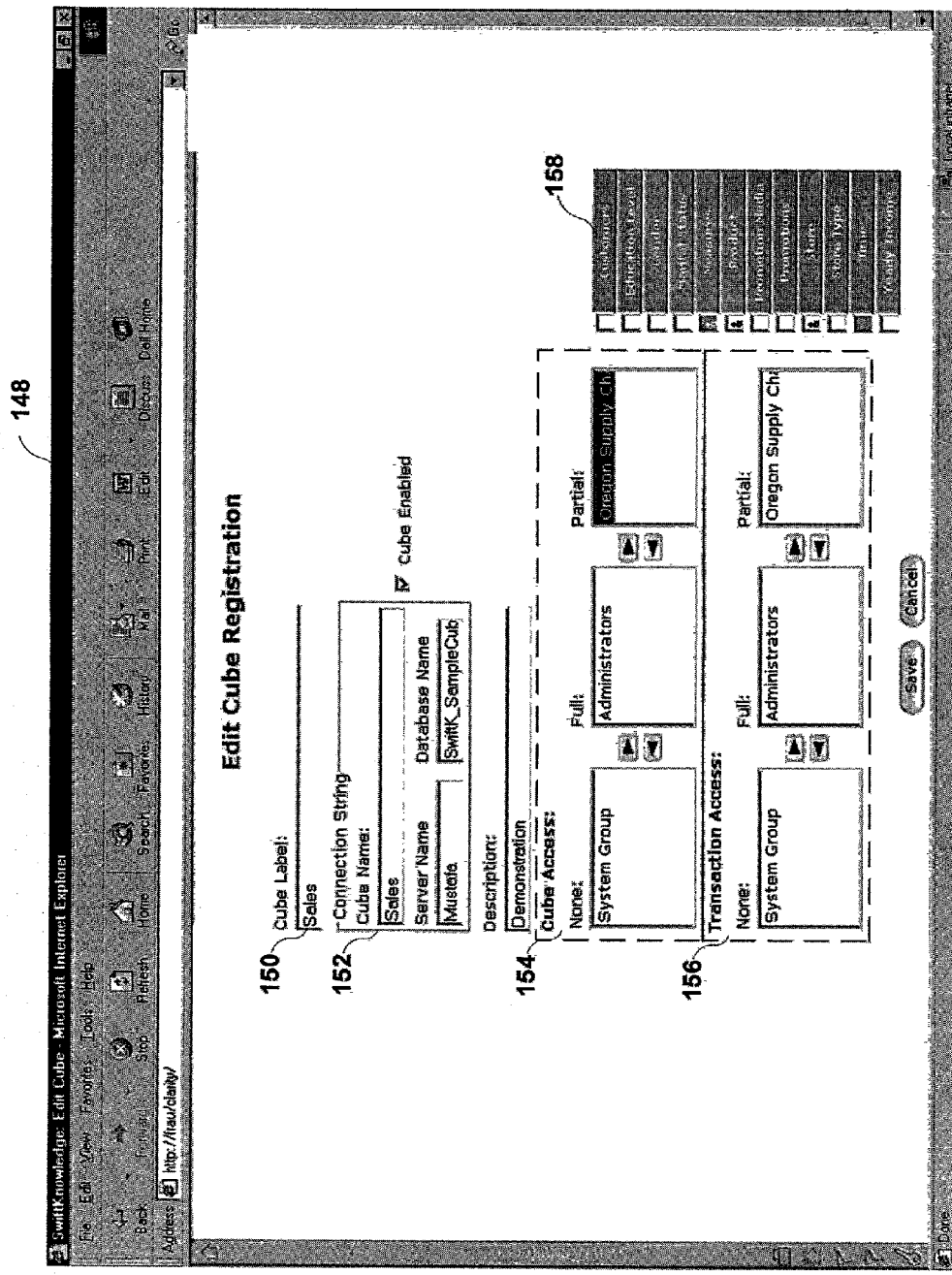

FIG. 34 illustrates an interface 148 provided by data access system 12 by which a user can register a data cube 17 and define any necessary security requirements. When registering a new data cube 17, the user supplies a label for the cube within text box 150. In addition, the user may define any necessary connection information 152 needed to locate the cube within data access system 12 including names for the server and database on which the data cube resides.

Interface 148 includes an input area 154 for securing access to data within data cube 17 and an input area 156 for securing access to the corresponding transactional data 16. Within the input areas 154 and 156, the user can set security access for user groups to the cube data and the transactional data, respectively. The user groups can comprise one or more users and can be mapped to different levels of access to the data within data cube 17 or transactional data 16. In the illustrated embodiment, each group can have no access, full access or partial access. For example, the user group entitled Oregon Supply Chain has partial access for both data cube 17 and transactional data 16.

Figure 35:
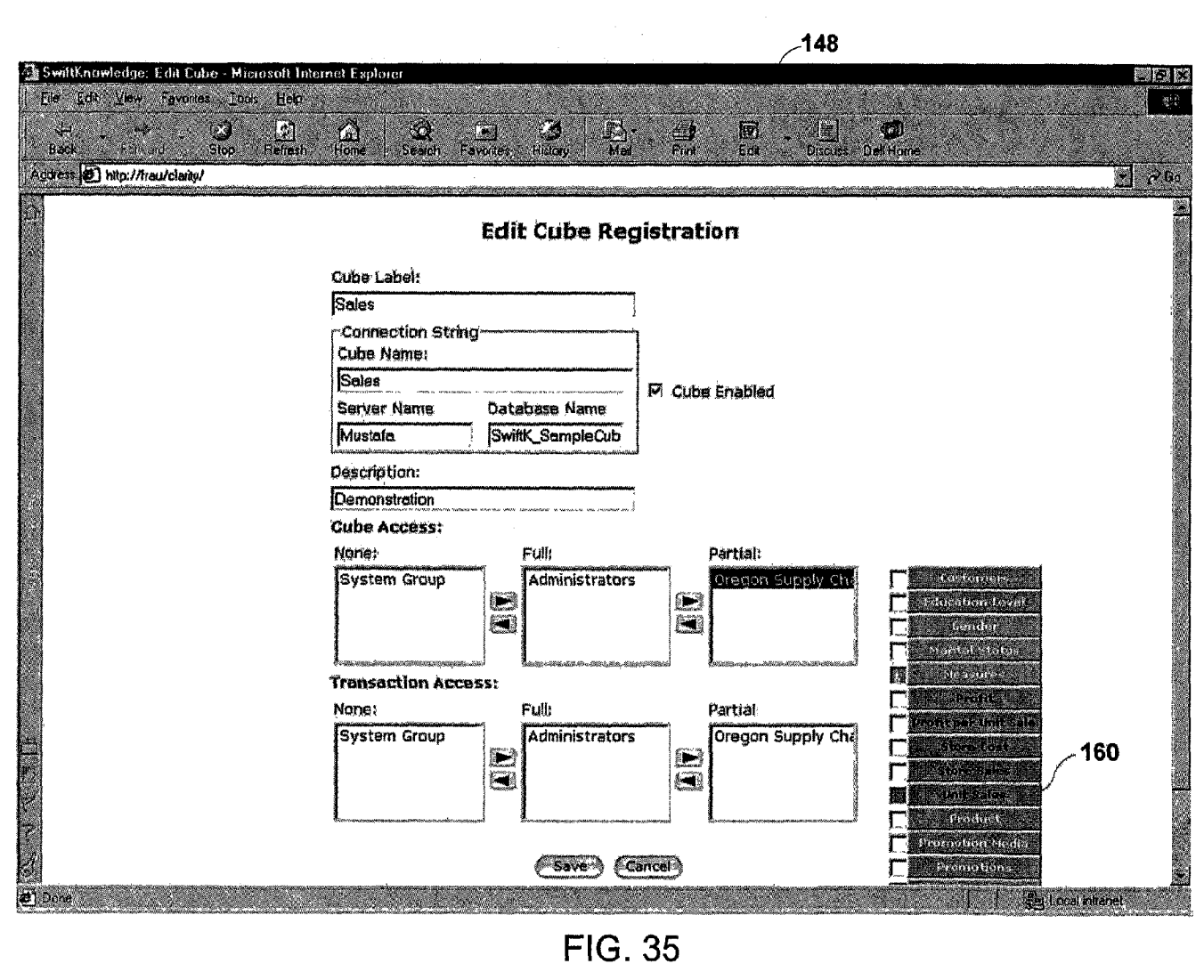
Figure 36:
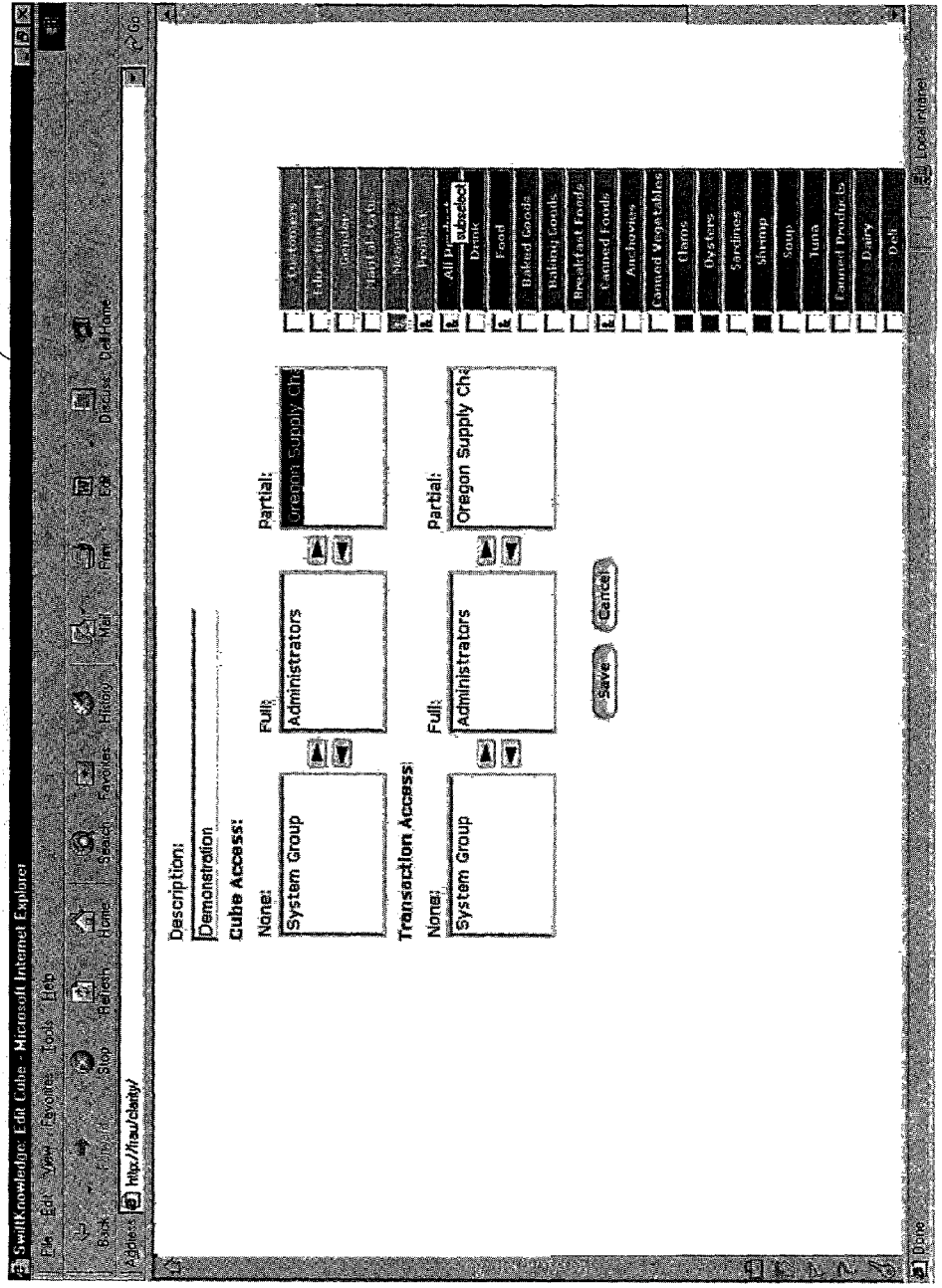

Input area 158 is used to control both data cube access and transactional data access, and lists the dimensional hierarchy for the defined data cube 17. After selecting a group from within input area 154 or 156, the user can then specify which dimensions, and members thereof, the group can access. For transactional data, as illustrated below, input area lists the underlying tables tables that store the transactional data. By clicking on and opening the dimensions or measures within input area 158, granular security can be defined by the user and enforced by data access system 12. For example, FIG. 35 illustrates that the Oregon Supply Chain user group will only be allowed to see the Unit Sales measure 160, among all available measures, as indicated by the adjacent solid box. A solid box indicates the member and all child members are accessible. An ampersand in a white box indicates that the sub-members are available, but not the subtotal. FIG. 36 further illustrates security such that the user group Oregon Supply Chain will only be able to view a few canned shellfish members within Canned Foods.

Figure 37:
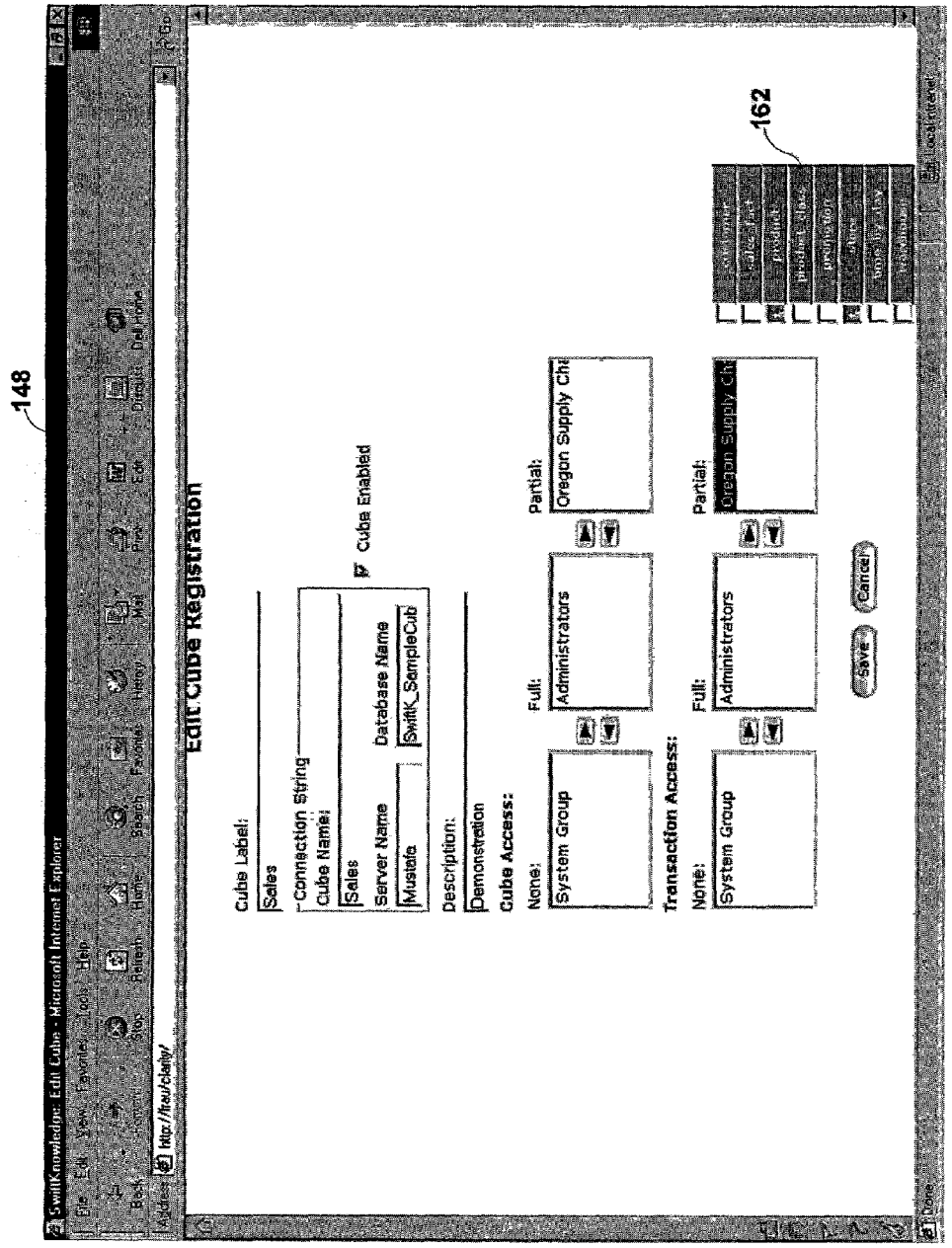
Figure 38:
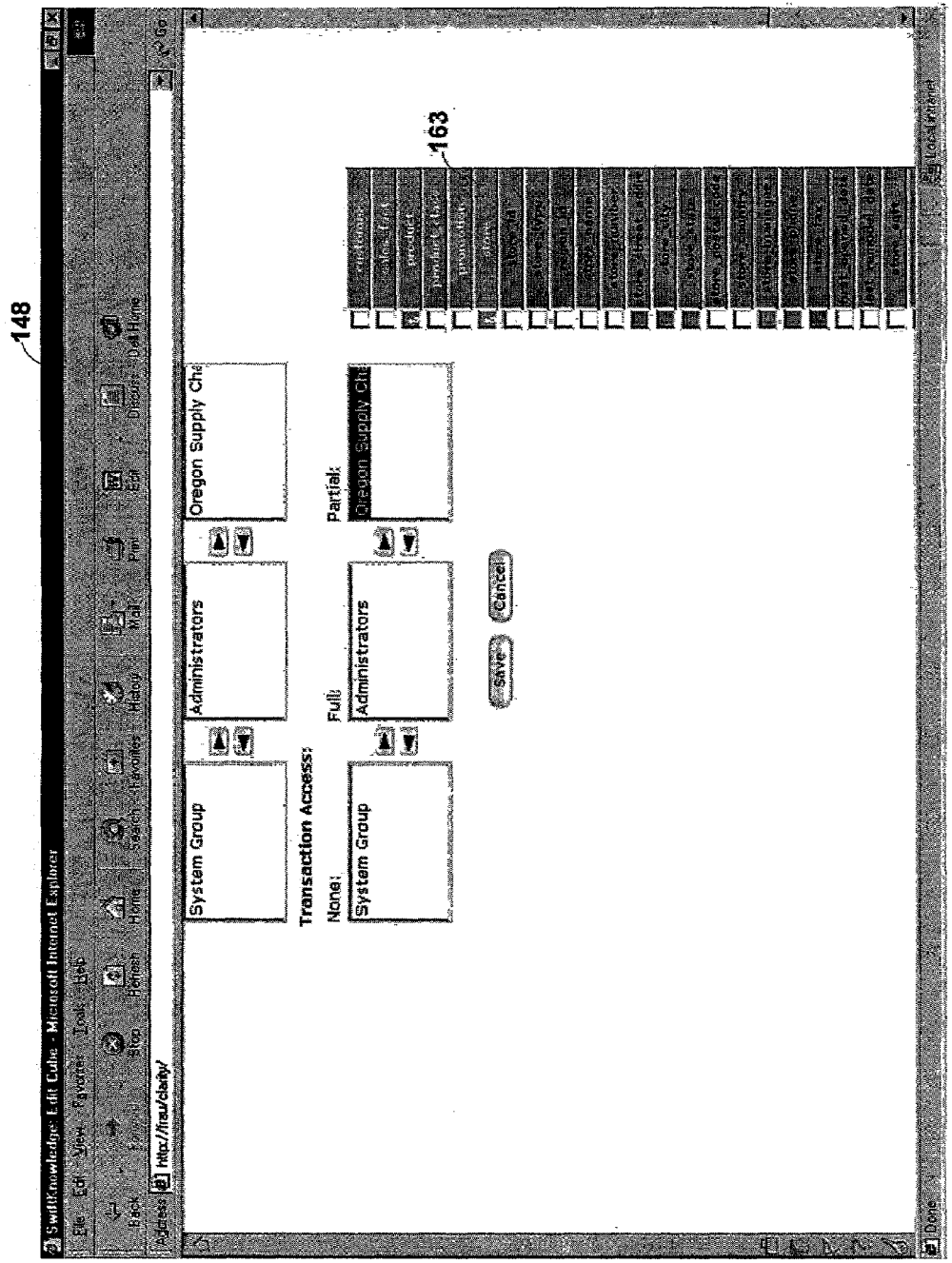

FIG. 37 illustrates the interface 148 while the user is setting security for transactional data 16. Similar to cube-level security, the user can give a group full, partial or no access to the transactional data, independent of the cube access rights defined for the group. Input area 162 lists the tables of the database that were used to create data cube 17. As illustrated in FIG. 38, the user may interact with interface 148 to give a group limited access to fields of the Store a given table, such Address, State, City, Phone, Fax and Manager within the Store table 163.

Figure 39:
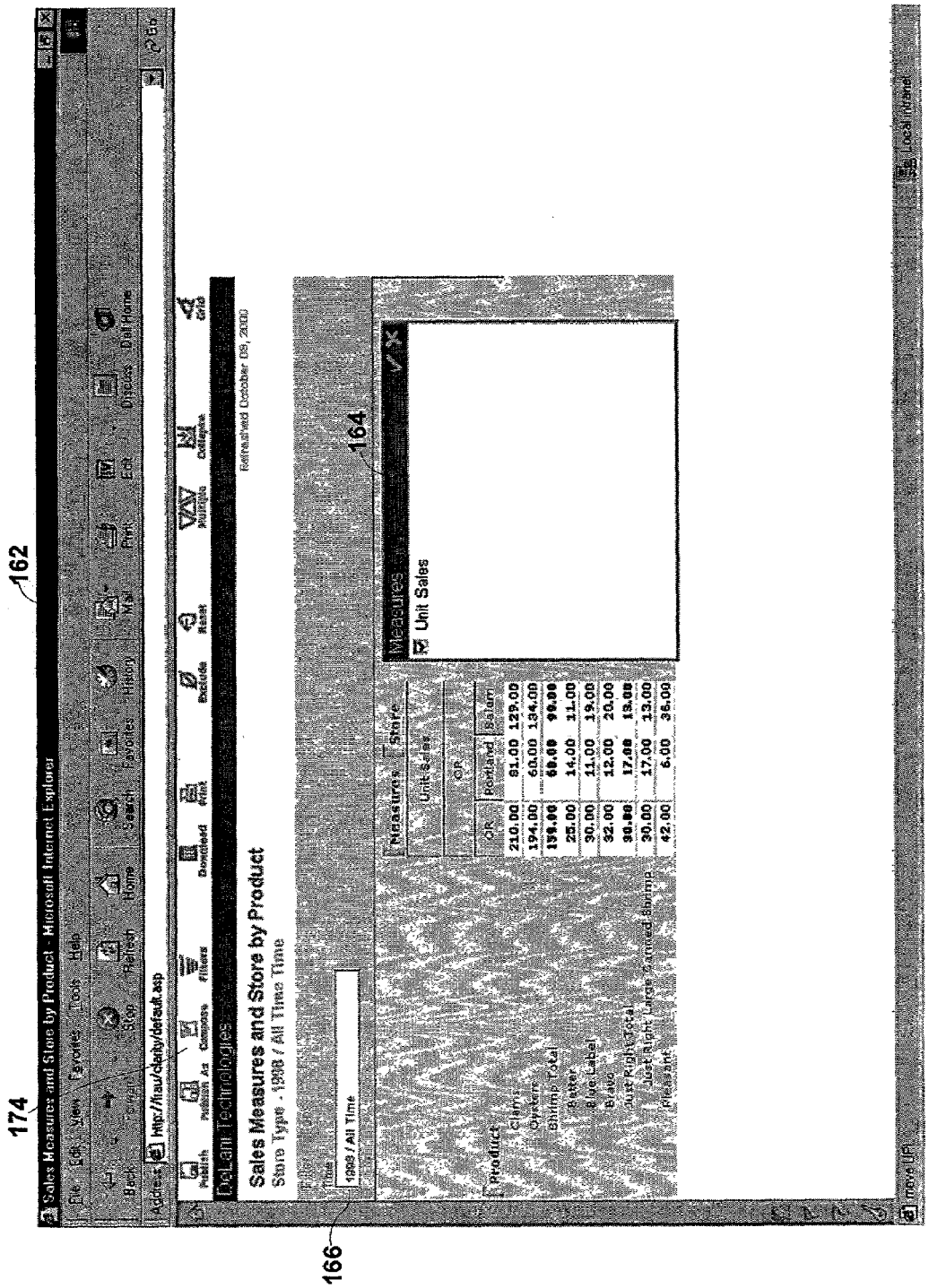

Once the user has defined the security settings for a report, access by other users 4 is controlled by data access system 12 according to the settings. FIG. 39 illustrates a user 4 within the Oregon Supply Chain user group logging into data access system 12 to view the published report. Because of the defined security settings, page generation module 26 produces web page 162 such that the user 4 can only view canned shellfish, including the members Clams, Oysters and Shrimp. The user 4, however, can expand down into the authorized portions of data cube 17 until reaching the lowest sub-members of the accessible dimensions.

Figure 40:
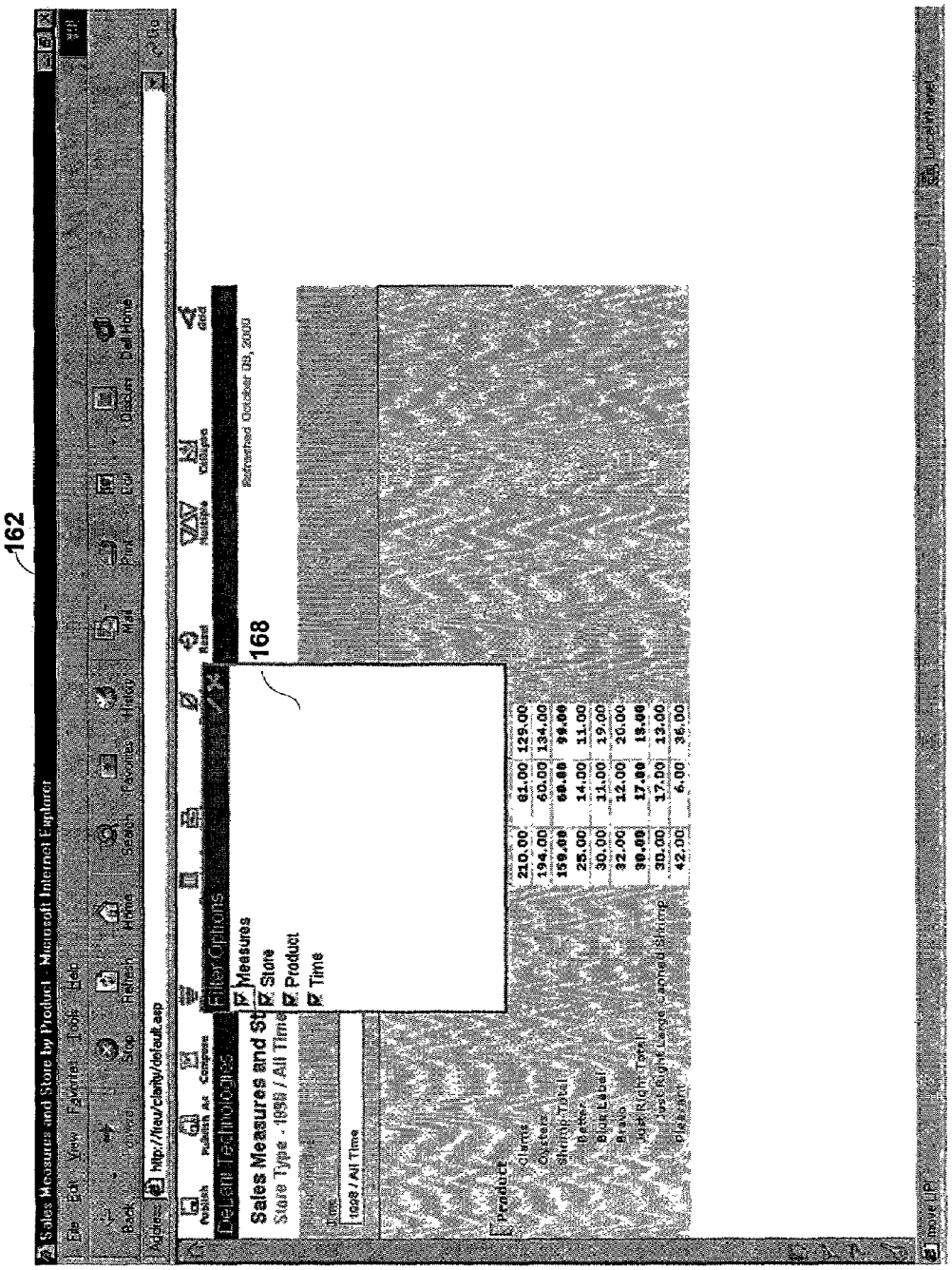

Based on the cube-level security, the filter and sub-filter functionality of the report is limited to the members and sub-members for which access to the user was granted. For example, in filter selection box 166, the user can only filter on the Time dimension, and not the Store Type dimension, based on the security settings. In addition, when selecting the Measure dimension, sub-filter window 164 allows the user to only sub-filter on Unit Sales, the only member to which the user has access. Similarly, as illustrated in FIG. 40, although the user has a filter icon to select dimensions for filtering, window 168 only displays the dimensions for which they have been authorized.

Figure 41:
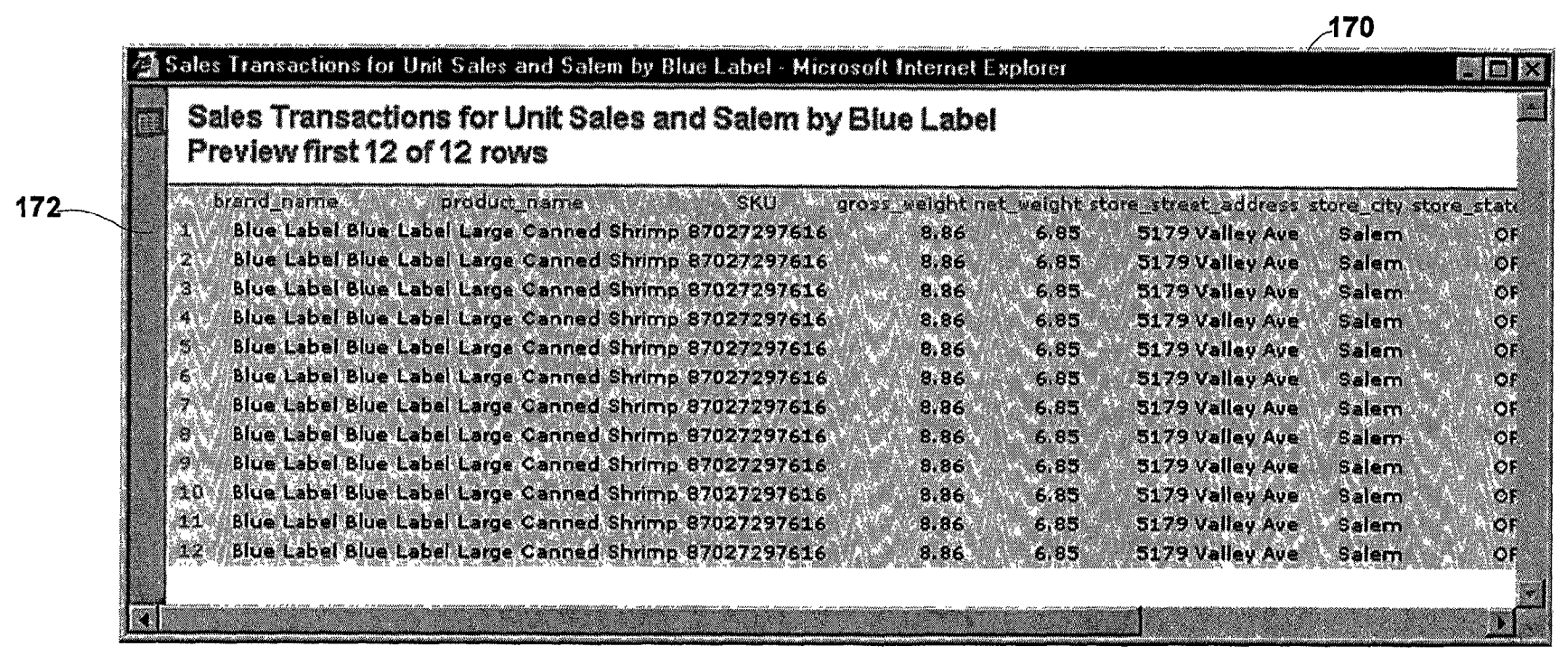

FIG. 41 illustrates a window 170 displayed by the user interface when the user selects a range of cells and elects to view the underlying transactional data 16. The records 172 listed by window 170 are limited to only the fields for which the user has been authorized, i.e., product and store information in this example.

Figure 42:
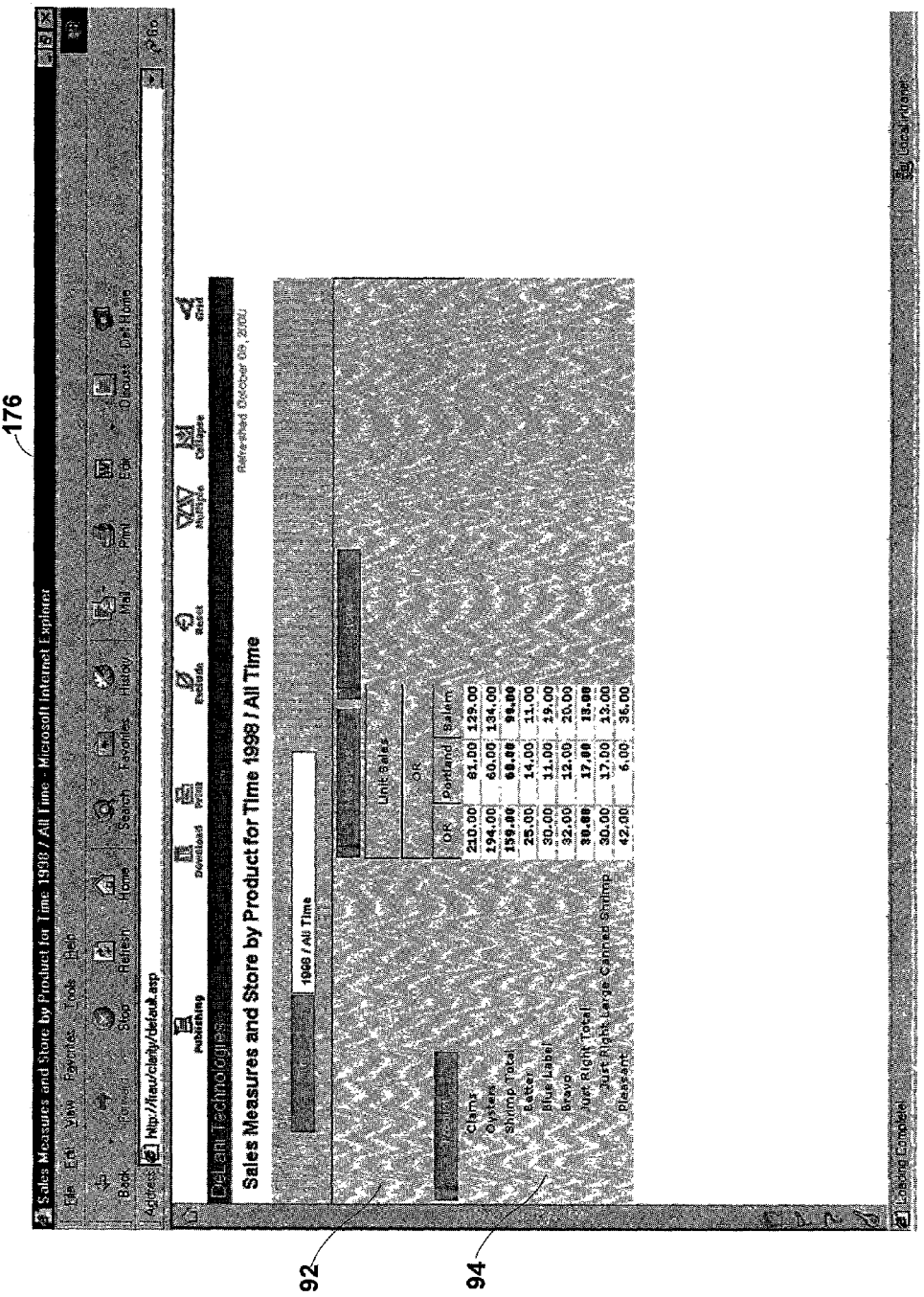

In addition to viewing and analyzing the data in a report, a user may be able to toggle into compose mode to compose a second report based on the permission settings for the user group. If the user has compose permissions, as indicated by a compose icon 174 (FIG. 39), the user can toggle into compose mode where the report layout is preserved visually. Security, however, remains enforced such that the user can only manipulate the dimensions, members and sub-members, that he or she has been given access. FIG. 42 illustrates a web page 176 generated by page generation module 26 when the user toggles into compose mode. Notably, web page 176 has a filter area 92 and a layout area 94, as described above, with which the user can interact to create a new report, limited to the accessible dimensions and members.

Various embodiments of the invention have been described. These and other embodiments are within the scope of the following claims.

The invention claimed is:

1. A method comprising:
   storing a report object on a server, wherein the report object identifies a data cube storing multidimensional data;
   in response to a request from a client device, retrieving the multidimensional data from the data cube in accordance with the report object;
   communicating the multidimensional data and a copy of the report object from the server to the client device;
   storing the multidimensional data within a virtual table on the client device;
   storing state data on the server, wherein the state data records a current viewing location within the virtual data table by the client device;
   formatting a web page at the server based on the current viewing location within the multidimensional data of the virtual data table stored at the client device as defined by the state data;
   communicating the web page to the client device;
   retrieving a subset of the multidimensional data from the virtual data of the client device based on the current viewing location to render the web page on the client device in accordance with the copy of the report object;
   in response to a scroll request from a user, selecting a different subset of the multidimensional data from the virtual table on the client device without requesting additional multidimensional data from the server;
   updating the web page at the client device to display the different subset of the multidimensional data; and
   sending a communication from the client device to the server to update the state table to record a new current viewing location within the virtual table on the client device in response to the scroll input.

2. The method of claim 1, wherein storing state data comprises storing at the server a starting row and a starting column within the data table stored on the client device.

3. The method of claim 1, wherein storing state data comprises storing one of a font size, a column width, a row width, a column height, a row height, one or more column labels and one or more row labels for use in formatting the web page.

4. The method of claim 1, wherein formatting the web page at the server based on the state data comprises:
   calculating widths and heights for rows and columns of the web page based on data of the data table stored on the client device; and
   generating code to format the web page according to the calculated widths and heights.

5. The method of claim 4, wherein the code comprises HTML.

6. A system comprising:
   a multidimensional database storing multidimensional data;
   a server storing a report object; and
   a client device coupled to the server;
   wherein the in response to a request from the client device, the server retrieves the multidimensional data in accordance with the report object and communicates the multidimensional data to the client device,
   wherein the client device includes a virtual table to store the multidimensional data received from the servers,
   wherein the server includes state data recording a current viewing location within the virtual table by the client device,
   wherein the server formats a web page based on the current viewing location within the multidimensional data stored at the client device, and
   wherein the client device retrieves a subset of the multidimensional data from the virtual data to render a web page on the client device and, in response to a scroll request, selects a different subset of the multidimensional data from the virtual table and updates the web page to display the different subset of the multidimensional data without requesting additional multidimensional data from the server, and
   wherein the client device sends a communication from the client device to the server to record a new current viewing location within the virtual table on the client device in response to the scroll input.

7. The system of claim 6, wherein the server includes a page generation module to format the web page based on the state data.

8. The system of claim 7, wherein the page generation module calculates widths and heights for rows and columns displayed to the user based on data of the data table.

9. The system of claim 7, wherein the page generation module embeds scroll bars in the web page based on an amount of data within the data table.

10. The system of claim 6,
    wherein the server includes a packet engine to communicate the multidimensional data to the client-device in a stream of packets, and
    wherein the packet engine outputs the stream of packets to first include the subset of the multidimensional data for rendering the web page by the client before the remainder of the multidimensional data is received by the client device and stored in the virtual table.

11. The system of claim 6, wherein the state data includes a starting row and a starting column within the virtual table.

12. The system of claim 6, wherein the state data includes one of a font size, a column width, a row width, a column height, a row height, one or more column labels and one or more row labels.

13. A method comprising:
communicating multidimensional data from a server to a client device;
storing the multidimensional data on the client device;
storing pointers at the client device defining a viewable window within the multidimensional data stored at the client device, wherein the viewable window is a subset of the data received from the server;
formatting at the server a web page to include the subset of the multidimensional data located within the viewable window into the multidimensional data stored on the client device;
displaying the web page to a user via the client device;
in response to a scroll request from a user, updating the pointers to define a new viewable window within the multidimensional data stored at the client device without requesting additional multidimensional data from the server;
updating the web page to display the new viewable window of the multidimensional data; and
sending a communication from the client device to record the new viewable window in response to the scroll input.

14. The method of claim 13, wherein communicating the multidimensional data comprises communicating the data to the client device in a stream of packets; and wherein storing the data comprises assembling the packets to form a virtual table on the client device.

15. The method of claim 13 further comprising:
transmitting an initial set of data packets to the client device;
storing data from the initial set of data packets; and
formatting the web page based on the data of initial set of data packets.

16. The method of claim 15 further comprising:
receiving a request for any remaining data packets; and
communicating the remaining data packets to the client device.

17. The method of claim 13 further comprising:
reordering rows of a document object model based on input received from user; and
filling the document object model with data encompassed by the viewable window.

18. The method of claim 13 further comprising:
receiving a user request to expand a member of the multidimensional data;
retrieving data for children of the expanded member as a function of the viewing window;
updating the pointers defining the viewable window to include the children of the expanded member; and
refreshing the display of the client device based on the expanded viewable window.

19. The method of claim 18 further wherein retrieving the multidimensional data comprises:
constructing a database query based on the pointers defining the viewable window; and
querying a database to retrieve rows proximate to the viewable window.

20. The method of claim 18 further comprising:
storing a report object defining at least the dimensions and members of the multidimensional data; and
updating a report object to include children of the member to be expanded.

21. The method of claim 20, further comprising:
storing the data on the client device as a virtual table; and
generating a client-side script to update the virtual table to accommodate the expanded member.

22. The method of claim 20 further comprising:
generating a client-side script based on the report object;
communicating the client-side script to the client device; and
executing the client-side script to create a representation of the report object on the client device.

23. The method of claim 22 further comprising generating client-side script to update the representation to accommodate additional data resulting from the expand request.

* * * * *